US008340110B2

(12) United States Patent
Gast

(10) Patent No.: US 8,340,110 B2
(45) Date of Patent: Dec. 25, 2012

(54) QUALITY OF SERVICE PROVISIONING FOR WIRELESS NETWORKS

(75) Inventor: Matthew Stuart Gast, San Francisco, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 147 days.

(21) Appl. No.: 11/845,029

(22) Filed: Aug. 24, 2007

(65) Prior Publication Data

US 2008/0069018 A1 Mar. 20, 2008

Related U.S. Application Data

(60) Provisional application No. 60/845,147, filed on Sep. 15, 2006.

(51) Int. Cl.
*H04L 12/28* (2006.01)
*H04L 12/56* (2006.01)
*G06F 7/04* (2006.01)
*G06F 17/30* (2006.01)
*G06F 15/16* (2006.01)

(52) U.S. Cl. .............. 370/412; 370/395.21; 370/395.42; 370/417; 455/452.1; 455/452.2; 726/2; 726/3; 726/21; 726/27

(58) Field of Classification Search ............. 370/395.21, 370/395.42, 431–449, 412–418; 455/435.1, 455/435.3, 452.1, 452.2; 709/219, 220, 224, 709/229; 710/39–42, 244; 726/2, 3, 21, 726/27
See application file for complete search history.

(56) References Cited

U.S. PATENT DOCUMENTS

| 3,641,433 | A | 2/1972 | Mifflin et al. |
| 3,906,166 | A | 9/1975 | Cooper et al. |
| 4,168,400 | A | 9/1979 | De Couasnon et al. |
| 4,176,316 | A | 11/1979 | DeRoas et al. |
| 4,247,908 | A | 1/1981 | Lockart et al. |
| 4,291,401 | A | 9/1981 | Bachmann |
| 4,291,409 | A | 9/1981 | Weinberg et al. |
| 4,409,470 | A | 10/1983 | Shepard et al. |
| 4,460,120 | A | 7/1984 | Shepard et al. |
| 4,475,208 | A | 10/1984 | Ricketts |
| 4,494,238 | A | 1/1985 | Groth, Jr. |
| 4,500,987 | A | 2/1985 | Hasegawa |
| 4,503,533 | A | 3/1985 | Tobagi et al. |
| 4,550,414 | A | 10/1985 | Guinon et al. |
| 4,562,415 | A | 12/1985 | McBiles |
| 4,630,264 | A | 12/1986 | Wah |
| 4,635,221 | A | 1/1987 | Kerr |
| 4,639,914 | A | 1/1987 | Winters |

(Continued)

FOREIGN PATENT DOCUMENTS

EP 0 992 921 A2 4/2000

(Continued)

OTHER PUBLICATIONS

U.S. Appl. No. 11/487,722, filed Jul. 2006, Simons et al.

(Continued)

*Primary Examiner* — Michael Thier
*Assistant Examiner* — Benjamin H Elliott, IV

(57) ABSTRACT

A technique for improving quality of service involves dynamically provisioning quality of service parameters. An example according to this technique is a system including a server and an access point. The server provisions quality of service parameters restricting the station's transmission of data through the access point to one or more access classes of varying priority.

17 Claims, 8 Drawing Sheets

U.S. PATENT DOCUMENTS

| | | | |
|---|---|---|---|
| 4,644,523 A | 2/1987 | Horwitz | |
| 4,672,658 A | 6/1987 | Kavehrad et al. | |
| 4,673,805 A | 6/1987 | Shepard et al. | |
| 4,707,839 A | 11/1987 | Andren et al. | |
| 4,730,340 A | 3/1988 | Frazier, Jr. | |
| 4,736,095 A | 4/1988 | Shepard et al. | |
| 4,740,792 A | 4/1988 | Sagey et al. | |
| 4,758,717 A | 7/1988 | Shepard et al. | |
| 4,760,586 A | 7/1988 | Takeda | |
| 4,789,983 A | 12/1988 | Acampora et al. | |
| 4,829,540 A | 5/1989 | Waggener et al. | |
| 4,850,009 A | 7/1989 | Zook et al. | |
| 4,872,182 A | 10/1989 | Mcrae et al. | |
| 4,894,842 A | 1/1990 | Brockhoven et al. | |
| 4,901,307 A | 2/1990 | Gilhousen et al. | |
| 4,933,952 A | 6/1990 | Albrieux et al. | |
| 4,933,953 A | 6/1990 | Yagi | |
| 4,955,053 A | 9/1990 | Siegmund | |
| 4,995,053 A | 2/1991 | Simpson et al. | |
| 5,008,899 A | 4/1991 | Yamamoto | |
| 5,027,343 A | 6/1991 | Chan et al. | |
| 5,029,183 A | 7/1991 | Tymes | |
| 5,103,459 A | 4/1992 | Gilhousen et al. | |
| 5,103,461 A | 4/1992 | Tymes | |
| 5,109,390 A | 4/1992 | Gilhousen et al. | |
| 5,119,502 A | 6/1992 | Kallin et al. | |
| 5,142,550 A | 8/1992 | Tymes | |
| 5,151,919 A | 9/1992 | Dent | |
| 5,157,687 A | 10/1992 | Tymes | |
| 5,187,675 A | 2/1993 | Dent et al. | |
| 5,231,633 A | 7/1993 | Hluchyj et al. | |
| 5,280,498 A | 1/1994 | Tymes et al. | |
| 5,285,494 A | 2/1994 | Sprecher et al. | |
| 5,327,144 A | 7/1994 | Stilp et al. | |
| 5,329,531 A | 7/1994 | Diepstraten | |
| 5,339,316 A | 8/1994 | Diepstraten | |
| 5,371,783 A | 12/1994 | Rose et al. | |
| 5,418,812 A | 5/1995 | Reyes et al. | |
| 5,432,842 A | 7/1995 | Kinoshita | |
| 5,444,851 A | 8/1995 | Woest | |
| 5,448,569 A | 9/1995 | Huang et al. | |
| 5,450,615 A | 9/1995 | Fortune et al. | |
| 5,465,401 A | 11/1995 | Thompson | |
| 5,479,441 A | 12/1995 | Tymes et al. | |
| 5,483,676 A | 1/1996 | Mahany et al. | |
| 5,491,644 A | 2/1996 | Pickering et al. | |
| 5,517,495 A | 5/1996 | Lund | |
| 5,519,762 A | 5/1996 | Bartlett | |
| 5,528,621 A | 6/1996 | Heiman et al. | |
| 5,542,100 A | 7/1996 | Hatakeyama | |
| 5,546,389 A * | 8/1996 | Wippenbeck et al. | 370/412 |
| 5,561,841 A | 10/1996 | Markus | |
| 5,568,513 A | 10/1996 | Croft et al. | |
| 5,570,366 A | 10/1996 | Baker et al. | |
| 5,584,048 A | 12/1996 | Wieczorek | |
| 5,598,532 A | 1/1997 | Liron | |
| 5,630,207 A | 5/1997 | Gitlin et al. | |
| 5,640,414 A | 6/1997 | Blakeney et al. | |
| 5,649,289 A | 7/1997 | Wang et al. | |
| 5,668,803 A | 9/1997 | Tymes et al. | |
| 5,670,964 A | 9/1997 | Dent | |
| 5,677,954 A | 10/1997 | Hirata et al. | |
| 5,706,428 A | 1/1998 | Boer et al. | |
| 5,715,304 A | 2/1998 | Nishida et al. | |
| 5,729,542 A * | 3/1998 | Dupont | 370/346 |
| 5,734,699 A | 3/1998 | Lu et al. | |
| 5,742,592 A * | 4/1998 | Scholefield et al. | 370/329 |
| 5,774,460 A | 6/1998 | Schiffel et al. | |
| 5,793,303 A | 8/1998 | Koga | |
| 5,794,128 A | 8/1998 | Brockel et al. | |
| 5,812,589 A | 9/1998 | Sealander et al. | |
| 5,815,811 A | 9/1998 | Pinard et al. | |
| 5,818,385 A | 10/1998 | Bartholomew | |
| 5,828,653 A * | 10/1998 | Goss | 370/230 |
| 5,828,960 A | 10/1998 | Tang et al. | |
| 5,835,061 A | 11/1998 | Stewart | |
| 5,838,907 A | 11/1998 | Hansen | |
| 5,844,900 A | 12/1998 | Hong et al. | |
| 5,852,722 A | 12/1998 | Hamilton | |
| 5,862,475 A | 1/1999 | Zicker et al. | |
| 5,872,968 A | 2/1999 | Knox et al. | |
| 5,875,179 A | 2/1999 | Tikalsky | |
| 5,887,259 A | 3/1999 | Zicker et al. | |
| 5,896,561 A | 4/1999 | Schrader et al. | |
| 5,909,686 A | 6/1999 | Muller et al. | |
| 5,915,214 A | 6/1999 | Reece et al. | |
| 5,920,821 A | 7/1999 | Seazholtz et al. | |
| 5,933,607 A | 8/1999 | Tate et al. | |
| 5,938,721 A | 8/1999 | Dussell et al. | |
| 5,949,988 A | 9/1999 | Feisullin et al. | |
| 5,953,669 A | 9/1999 | Stratis et al. | |
| 5,960,335 A | 9/1999 | Umemoto et al. | |
| 5,969,678 A | 10/1999 | Stewart | |
| 5,970,066 A | 10/1999 | Lowry et al. | |
| 5,977,913 A | 11/1999 | Christ | |
| 5,980,078 A | 11/1999 | Krivoshein et al. | |
| 5,982,779 A | 11/1999 | Krishnakumar et al. | |
| 5,987,062 A | 11/1999 | Engwer et al. | |
| 5,987,328 A | 11/1999 | Ephremides et al. | |
| 5,991,817 A | 11/1999 | Rowett et al. | |
| 5,999,813 A | 12/1999 | Lu et al. | |
| 6,005,853 A | 12/1999 | Wang et al. | |
| 6,011,784 A | 1/2000 | Brown | |
| 6,012,088 A | 1/2000 | Li et al. | |
| 6,029,196 A | 2/2000 | Lenz | |
| 6,041,240 A | 3/2000 | McCarthy et al. | |
| 6,041,358 A | 3/2000 | Huang et al. | |
| 6,070,243 A | 5/2000 | See et al. | |
| 6,073,075 A | 6/2000 | Kondou et al. | |
| 6,073,152 A | 6/2000 | De Vries | |
| 6,078,568 A | 6/2000 | Wright et al. | |
| 6,088,591 A | 7/2000 | Trompower | |
| 6,101,539 A | 8/2000 | Kennelly et al. | |
| 6,115,390 A * | 9/2000 | Chuah | 370/443 |
| 6,118,771 A | 9/2000 | Tajika et al. | |
| 6,119,009 A | 9/2000 | Baranger et al. | |
| 6,122,520 A | 9/2000 | Want et al. | |
| 6,144,638 A | 11/2000 | Obenhuber et al. | |
| 6,148,199 A | 11/2000 | Hoffman et al. | |
| 6,154,776 A * | 11/2000 | Martin | 709/226 |
| 6,160,804 A | 12/2000 | Ahmed et al. | |
| 6,177,905 B1 | 1/2001 | Welch | |
| 6,188,694 B1 | 2/2001 | Fine et al. | |
| 6,199,032 B1 | 3/2001 | Anderson | |
| 6,208,629 B1 | 3/2001 | Jaszewki et al. | |
| 6,208,841 B1 | 3/2001 | Wallace et al. | |
| 6,212,395 B1 | 4/2001 | Lu et al. | |
| 6,218,930 B1 | 4/2001 | Katzenberg et al. | |
| 6,240,078 B1 | 5/2001 | Kuhnel et al. | |
| 6,240,083 B1 | 5/2001 | Wright | |
| 6,240,291 B1 | 5/2001 | Narasimhan et al. | |
| 6,246,751 B1 * | 6/2001 | Bergl et al. | 379/67.1 |
| 6,249,252 B1 | 6/2001 | Dupray | |
| 6,256,300 B1 | 7/2001 | Ahmed et al. | |
| 6,256,334 B1 | 7/2001 | Adachi | |
| 6,259,405 B1 | 7/2001 | Stewart et al. | |
| 6,262,988 B1 | 7/2001 | Vig | |
| 6,269,246 B1 | 7/2001 | Rao et al. | |
| 6,285,662 B1 | 9/2001 | Watannabe | |
| 6,304,596 B1 | 10/2001 | Yamano et al. | |
| 6,304,906 B1 * | 10/2001 | Bhatti et al. | 709/227 |
| 6,317,599 B1 | 11/2001 | Rappaport et al. | |
| 6,326,918 B1 | 12/2001 | Stewart | |
| 6,336,035 B1 | 1/2002 | Somoza et al. | |
| 6,336,152 B1 | 1/2002 | Richman et al. | |
| 6,347,091 B1 | 2/2002 | Wallentin et al. | |
| 6,356,758 B1 | 3/2002 | Almeida et al. | |
| 6,393,290 B1 | 5/2002 | Ulfongene | |
| 6,397,040 B1 | 5/2002 | Titmuss et al. | |
| 6,404,772 B1 | 6/2002 | Beach et al. | |
| 6,421,714 B1 | 7/2002 | Rai et al. | |
| 6,429,879 B1 | 8/2002 | Sturgeon et al. | |
| 6,446,206 B1 * | 9/2002 | Feldbaum | 713/175 |
| 6,456,239 B1 | 9/2002 | Werb et al. | |
| 6,470,025 B1 | 10/2002 | Wilson et al. | |
| 6,473,449 B1 | 10/2002 | Cafarella et al. | |
| 6,493,679 B1 | 12/2002 | Rappaport et al. | |

| | | | |
|---|---|---|---|
| 6,496,290 B1 | 12/2002 | Lee | |
| 6,512,916 B1 | 1/2003 | Forbes, Jr. | |
| 6,526,275 B1 | 2/2003 | Calvert | |
| 6,535,732 B1 | 3/2003 | McIntosh et al. | |
| 6,564,380 B1 | 5/2003 | Murphy | |
| 6,567,146 B2 | 5/2003 | Hirakata et al. | |
| 6,567,416 B1* | 5/2003 | Chuah | 370/418 |
| 6,574,240 B1 | 6/2003 | Tzeng | |
| 6,580,700 B1 | 6/2003 | Pinard et al. | |
| 6,587,680 B1 | 7/2003 | Ata-Laurila et al. | |
| 6,587,835 B1 | 7/2003 | Treyz et al. | |
| 6,603,970 B1 | 8/2003 | Huelamo Platas et al. | |
| 6,614,787 B1 | 9/2003 | Jain et al. | |
| 6,615,276 B1 | 9/2003 | Mastrianni et al. | |
| 6,624,762 B1 | 9/2003 | End, III | |
| 6,625,454 B1 | 9/2003 | Rappaport et al. | |
| 6,640,312 B1 | 10/2003 | Thomson et al. | |
| 6,650,912 B2 | 11/2003 | Chen et al. | |
| 6,658,389 B1 | 12/2003 | Alpdemir | |
| 6,659,947 B1 | 12/2003 | Carter et al. | |
| 6,661,787 B1 | 12/2003 | O'Connell et al. | |
| 6,674,403 B2 | 1/2004 | Gray et al. | |
| 6,677,894 B2 | 1/2004 | Sheynblat et al. | |
| 6,678,516 B2 | 1/2004 | Nordman et al. | |
| 6,678,802 B2* | 1/2004 | Hickson | 711/152 |
| 6,687,498 B2 | 2/2004 | McKenna et al. | |
| 6,697,415 B1 | 2/2004 | Mahany | |
| 6,721,334 B1 | 4/2004 | Ketcham | |
| 6,721,548 B1 | 4/2004 | Mohindra et al. | |
| 6,725,260 B1 | 4/2004 | Philyaw | |
| 6,738,629 B1 | 5/2004 | McCormick et al. | |
| 6,747,961 B1 | 6/2004 | Ahmed et al. | |
| 6,756,940 B2 | 6/2004 | Oh et al. | |
| 6,760,324 B1 | 7/2004 | Scott et al. | |
| 6,785,275 B1 | 8/2004 | Boivie et al. | |
| 6,798,788 B1 | 9/2004 | Viswanath et al. | |
| 6,801,782 B2 | 10/2004 | McCrady et al. | |
| 6,826,399 B1 | 11/2004 | Hoffman et al. | |
| 6,839,338 B1 | 1/2005 | Amara et al. | |
| 6,839,348 B2 | 1/2005 | Tang et al. | |
| 6,839,388 B2 | 1/2005 | Vaidyanathan | |
| 6,847,620 B1 | 1/2005 | Meier | |
| 6,847,892 B2 | 1/2005 | Zhou et al. | |
| 6,856,800 B1 | 2/2005 | Henry et al. | |
| 6,879,812 B2 | 4/2005 | Agrawal et al. | |
| 6,901,439 B1 | 5/2005 | Bonasia et al. | |
| 6,917,688 B2 | 7/2005 | Yu et al. | |
| 6,934,260 B1 | 8/2005 | Kanuri | |
| 6,937,566 B1* | 8/2005 | Forslow | 370/231 |
| 6,938,079 B1 | 8/2005 | Anderson et al. | |
| 6,957,067 B1 | 10/2005 | Iyer et al. | |
| 6,973,622 B1 | 12/2005 | Rappaport et al. | |
| 6,978,301 B1 | 12/2005 | Tindal | |
| 6,980,533 B1* | 12/2005 | Abraham et al. | 370/329 |
| 6,985,469 B2 | 1/2006 | Leung | |
| 6,990,348 B1 | 1/2006 | Benveniste | |
| 6,993,683 B2 | 1/2006 | Bhat et al. | |
| 6,996,630 B1 | 2/2006 | Masaki et al. | |
| 7,013,157 B1 | 3/2006 | Norman et al. | |
| 7,020,438 B2 | 3/2006 | Sinivaara et al. | |
| 7,020,773 B1 | 3/2006 | Otway et al. | |
| 7,024,199 B1 | 4/2006 | Massie et al. | |
| 7,024,394 B1 | 4/2006 | Ashour et al. | |
| 7,027,773 B1 | 4/2006 | McMillin | |
| 7,031,705 B2 | 4/2006 | Grootwassink | |
| 7,035,220 B1 | 4/2006 | Simcoe | |
| 7,039,037 B2* | 5/2006 | Wang et al. | 370/349 |
| 7,058,414 B1 | 6/2006 | Rofheart et al. | |
| 7,062,566 B2 | 6/2006 | Amara et al. | |
| 7,068,999 B2 | 6/2006 | Ballai | |
| 7,079,537 B1 | 7/2006 | Kanuri et al. | |
| 7,089,322 B1 | 8/2006 | Stallmann | |
| 7,092,529 B2 | 8/2006 | Yu et al. | |
| 7,110,756 B2 | 9/2006 | Diener | |
| 7,116,979 B2 | 10/2006 | Backes et al. | |
| 7,126,913 B1 | 10/2006 | Patel et al. | |
| 7,134,012 B2 | 11/2006 | Doyle et al. | |
| 7,139,829 B2 | 11/2006 | Wenzel et al. | |
| 7,142,867 B1* | 11/2006 | Gandhi et al. | 455/453 |
| 7,146,166 B2 | 12/2006 | Backes et al. | |
| 7,155,236 B2 | 12/2006 | Chen et al. | |
| 7,155,518 B2 | 12/2006 | Forslow | |
| 7,158,777 B2 | 1/2007 | Lee et al. | |
| 7,159,016 B2 | 1/2007 | Baker | |
| 7,221,927 B2 | 5/2007 | Kolar et al. | |
| 7,224,970 B2 | 5/2007 | Smith et al. | |
| 7,239,862 B1 | 7/2007 | Clare et al. | |
| 7,246,243 B2 | 7/2007 | Uchida | |
| 7,263,366 B2 | 8/2007 | Miyashita | |
| 7,274,730 B2* | 9/2007 | Nakabayashi | 375/220 |
| 7,280,495 B1 | 10/2007 | Zweig et al. | |
| 7,290,051 B2 | 10/2007 | Dobric et al. | |
| 7,293,136 B1* | 11/2007 | More et al. | 711/112 |
| 7,310,664 B1 | 12/2007 | Merchant et al. | |
| 7,317,914 B2 | 1/2008 | Adya et al. | |
| 7,320,070 B2 | 1/2008 | Baum | |
| 7,324,468 B2 | 1/2008 | Fischer | |
| 7,324,487 B2 | 1/2008 | Saito | |
| 7,324,489 B1 | 1/2008 | Iyer et al. | |
| 7,336,961 B1 | 2/2008 | Ngan | |
| 7,349,412 B1 | 3/2008 | Jones et al. | |
| 7,350,077 B2 | 3/2008 | Meier et al. | |
| 7,359,676 B2 | 4/2008 | Hrastar | |
| 7,370,362 B2 | 5/2008 | Olson et al. | |
| 7,376,080 B1 | 5/2008 | Riddle et al. | |
| 7,379,423 B1 | 5/2008 | Caves et al. | |
| 7,382,756 B2* | 6/2008 | Barber et al. | 370/338 |
| 7,417,953 B2 | 8/2008 | Hicks et al. | |
| 7,421,248 B1 | 9/2008 | Laux et al. | |
| 7,421,487 B1* | 9/2008 | Peterson et al. | 709/223 |
| 7,440,416 B2* | 10/2008 | Mahany et al. | 370/254 |
| 7,443,823 B2* | 10/2008 | Hunkeler et al. | 370/338 |
| 7,447,502 B2 | 11/2008 | Buckley | |
| 7,451,316 B2 | 11/2008 | Halasz et al. | |
| 7,460,855 B2* | 12/2008 | Barkley et al. | 455/411 |
| 7,466,678 B2 | 12/2008 | Cromer et al. | |
| 7,475,130 B2* | 1/2009 | Silverman | 709/223 |
| 7,477,894 B1 | 1/2009 | Sinha | |
| 7,480,264 B1 | 1/2009 | Duo et al. | |
| 7,483,390 B2 | 1/2009 | Rover et al. | |
| 7,489,648 B2 | 2/2009 | Griswold | |
| 7,493,407 B2* | 2/2009 | Leedom et al. | 709/232 |
| 7,505,434 B1 | 3/2009 | Backes | |
| 7,509,096 B2 | 3/2009 | Palm et al. | |
| 7,519,372 B2 | 4/2009 | MacDonald et al. | |
| 7,529,925 B2 | 5/2009 | Harkins | |
| 7,551,574 B1 | 6/2009 | Peden, II et al. | |
| 7,551,619 B2 | 6/2009 | Tiwari | |
| 7,558,266 B2 | 7/2009 | Hu | |
| 7,570,656 B2 | 8/2009 | Raphaeli et al. | |
| 7,573,859 B2 | 8/2009 | Taylor | |
| 7,577,453 B2 | 8/2009 | Matta | |
| 7,592,906 B1* | 9/2009 | Hanna et al. | 340/506 |
| 7,603,119 B1 | 10/2009 | Durig et al. | |
| 7,636,363 B2* | 12/2009 | Chang et al. | 370/395.42 |
| 7,680,501 B2 | 3/2010 | Sillasto et al. | |
| 7,693,526 B2* | 4/2010 | Qian et al. | 455/452.1 |
| 7,715,432 B2 | 5/2010 | Bennett | |
| 7,716,379 B2 | 5/2010 | Ruan et al. | |
| 7,724,703 B2 | 5/2010 | Matta et al. | |
| 7,724,704 B2 | 5/2010 | Simons et al. | |
| 7,729,278 B2 | 6/2010 | Chari et al. | |
| 7,733,868 B2 | 6/2010 | Van Zijst | |
| 7,746,897 B2 | 6/2010 | Stephenson et al. | |
| 7,788,475 B2 | 8/2010 | Zimmer et al. | |
| 7,805,529 B2* | 9/2010 | Galluzzo et al. | 709/229 |
| 7,844,298 B2 | 11/2010 | Riley | |
| 7,865,713 B2 | 1/2011 | Chesnutt et al. | |
| 7,873,061 B2 | 1/2011 | Gast et al. | |
| 7,894,852 B2 | 2/2011 | Hansen | |
| 7,912,982 B2 | 3/2011 | Murphy | |
| 7,920,548 B2 | 4/2011 | Lor et al. | |
| 7,929,922 B2 | 4/2011 | Kubo | |
| 7,945,399 B2 | 5/2011 | Nosovitsky et al. | |
| 7,986,940 B2 | 7/2011 | Lee et al. | |
| 8,000,724 B1 | 8/2011 | Rayburn et al. | |
| 8,019,082 B1 | 9/2011 | Wiedmann et al. | |
| 8,019,352 B2 | 9/2011 | Rappaport et al. | |

| | | |
|---|---|---|
| 8,116,275 B2 | 2/2012 | Matta et al. |
| 8,150,357 B2 | 4/2012 | Aragon |
| 8,161,278 B2 | 4/2012 | Harkins |
| 2001/0024953 A1 | 9/2001 | Balogh |
| 2002/0021701 A1* | 2/2002 | Lavian et al. ............... 370/401 |
| 2002/0038253 A1 | 3/2002 | Seaman et al. |
| 2002/0052205 A1 | 5/2002 | Belostofsky et al. |
| 2002/0060995 A1 | 5/2002 | Cervello et al. |
| 2002/0062384 A1 | 5/2002 | Tso |
| 2002/0069278 A1 | 6/2002 | Forslow |
| 2002/0078361 A1 | 6/2002 | Giroux et al. |
| 2002/0080790 A1 | 6/2002 | Beshai |
| 2002/0087699 A1* | 7/2002 | Karagiannis et al. ......... 709/227 |
| 2002/0094824 A1 | 7/2002 | Kennedy et al. |
| 2002/0095486 A1 | 7/2002 | Bahl |
| 2002/0101868 A1 | 8/2002 | Clear et al. |
| 2002/0116655 A1* | 8/2002 | Lew et al. ................... 713/323 |
| 2002/0157020 A1 | 10/2002 | Royer |
| 2002/0174137 A1 | 11/2002 | Wolff et al. |
| 2002/0176437 A1 | 11/2002 | Busch et al. |
| 2002/0188756 A1 | 12/2002 | Weil et al. |
| 2002/0191572 A1 | 12/2002 | Weinstein et al. |
| 2002/0194251 A1* | 12/2002 | Richter et al. ................ 709/105 |
| 2003/0014646 A1 | 1/2003 | Buddhikot et al. |
| 2003/0018889 A1 | 1/2003 | Burnett et al. |
| 2003/0043073 A1 | 3/2003 | Gray et al. |
| 2003/0055959 A1 | 3/2003 | Sato |
| 2003/0107590 A1* | 6/2003 | Levillain et al. ............. 345/736 |
| 2003/0120764 A1 | 6/2003 | Laye et al. |
| 2003/0133450 A1 | 7/2003 | Baum |
| 2003/0134642 A1 | 7/2003 | Kostic et al. |
| 2003/0135762 A1 | 7/2003 | Macaulay |
| 2003/0156586 A1 | 8/2003 | Lee et al. |
| 2003/0174706 A1 | 9/2003 | Shankar et al. |
| 2003/0193910 A1 | 10/2003 | Shoaib et al. |
| 2003/0204596 A1* | 10/2003 | Yadav ........................... 709/226 |
| 2003/0224735 A1 | 12/2003 | Moursund et al. |
| 2003/0227934 A1 | 12/2003 | White et al. |
| 2004/0002343 A1 | 1/2004 | Brauel et al. |
| 2004/0003285 A1 | 1/2004 | Whelan et al. |
| 2004/0019857 A1 | 1/2004 | Teig et al. |
| 2004/0025044 A1 | 2/2004 | Day |
| 2004/0029580 A1 | 2/2004 | Haverinen et al. |
| 2004/0030777 A1* | 2/2004 | Reedy et al. .................. 709/224 |
| 2004/0038687 A1 | 2/2004 | Nelson |
| 2004/0044749 A1* | 3/2004 | Harkin .......................... 709/219 |
| 2004/0047320 A1 | 3/2004 | Eglin |
| 2004/0053632 A1 | 3/2004 | Nikkelen et al. |
| 2004/0054569 A1 | 3/2004 | Pombo et al. |
| 2004/0054774 A1* | 3/2004 | Barber et al. ................. 709/224 |
| 2004/0054926 A1 | 3/2004 | Ocepek et al. |
| 2004/0062267 A1 | 4/2004 | Minami et al. |
| 2004/0064560 A1* | 4/2004 | Zhang et al. .................. 709/226 |
| 2004/0068668 A1 | 4/2004 | Lor et al. |
| 2004/0078598 A1* | 4/2004 | Barber et al. ................. 713/201 |
| 2004/0093506 A1* | 5/2004 | Grawrock et al. ............ 713/189 |
| 2004/0095914 A1* | 5/2004 | Katsube et al. ............... 370/338 |
| 2004/0095932 A1 | 5/2004 | Astarabadi et al. |
| 2004/0106403 A1* | 6/2004 | Mori et al. ................. 455/426.2 |
| 2004/0111640 A1 | 6/2004 | Baum |
| 2004/0114546 A1 | 6/2004 | Seshadri et al. |
| 2004/0119641 A1 | 6/2004 | Rapeli |
| 2004/0120370 A1 | 6/2004 | Lupo |
| 2004/0143428 A1 | 7/2004 | Rappaport et al. |
| 2004/0143755 A1 | 7/2004 | Whitaker et al. |
| 2004/0165545 A1 | 8/2004 | Cook |
| 2004/0174900 A1 | 9/2004 | Volpi et al. |
| 2004/0184475 A1* | 9/2004 | Meier ............................ 370/449 |
| 2004/0208570 A1 | 10/2004 | Reader |
| 2004/0214572 A1 | 10/2004 | Thompson et al. |
| 2004/0221042 A1 | 11/2004 | Meier |
| 2004/0230370 A1 | 11/2004 | Tzamaloukas |
| 2004/0233234 A1 | 11/2004 | Chaudhry et al. |
| 2004/0236702 A1 | 11/2004 | Fink et al. |
| 2004/0246937 A1* | 12/2004 | Duong et al. ................. 370/345 |
| 2004/0246962 A1* | 12/2004 | Kopeikin et al. ............. 370/392 |
| 2004/0252656 A1 | 12/2004 | Shiu et al. |
| 2004/0255167 A1 | 12/2004 | Knight |
| 2004/0259542 A1 | 12/2004 | Viitamaki et al. |
| 2004/0259555 A1 | 12/2004 | Rappaport et al. |
| 2004/0259575 A1 | 12/2004 | Perez-Breva et al. |
| 2005/0015592 A1* | 1/2005 | Lin ............................... 713/166 |
| 2005/0021979 A1 | 1/2005 | Wiedmann et al. |
| 2005/0025105 A1* | 2/2005 | Rue ............................... 370/338 |
| 2005/0026611 A1 | 2/2005 | Backes |
| 2005/0030894 A1* | 2/2005 | Stephens ....................... 370/230 |
| 2005/0030929 A1 | 2/2005 | Swier et al. |
| 2005/0037818 A1 | 2/2005 | Seshadri et al. |
| 2005/0040968 A1 | 2/2005 | Damarla et al. |
| 2005/0054326 A1 | 3/2005 | Rogers |
| 2005/0054350 A1 | 3/2005 | Zegelin |
| 2005/0058132 A1 | 3/2005 | Okano et al. |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0078644 A1 | 4/2005 | Tsai et al. |
| 2005/0097618 A1 | 5/2005 | Arling et al. |
| 2005/0114649 A1 | 5/2005 | Challener et al. |
| 2005/0120125 A1 | 6/2005 | Morten et al. |
| 2005/0122927 A1 | 6/2005 | Wentink |
| 2005/0122977 A1 | 6/2005 | Lieberman |
| 2005/0128142 A1 | 6/2005 | Shin et al. |
| 2005/0128989 A1 | 6/2005 | Bhagwat et al. |
| 2005/0144237 A1 | 6/2005 | Heredia et al. |
| 2005/0147032 A1 | 7/2005 | Lyon et al. |
| 2005/0154933 A1 | 7/2005 | Hsu et al. |
| 2005/0157730 A1 | 7/2005 | Grant et al. |
| 2005/0159154 A1 | 7/2005 | Goren |
| 2005/0163078 A1 | 7/2005 | Oba et al. |
| 2005/0163146 A1 | 7/2005 | Ota et al. |
| 2005/0175027 A1* | 8/2005 | Miller et al. .................. 370/458 |
| 2005/0180345 A1 | 8/2005 | Meier |
| 2005/0180358 A1 | 8/2005 | Kolar et al. |
| 2005/0181805 A1 | 8/2005 | Gallagher |
| 2005/0190714 A1 | 9/2005 | Gorbatov et al. |
| 2005/0193103 A1 | 9/2005 | Drabik |
| 2005/0207336 A1* | 9/2005 | Choi et al. .................... 370/208 |
| 2005/0213519 A1 | 9/2005 | Relan et al. |
| 2005/0220033 A1 | 10/2005 | DelRegno et al. |
| 2005/0223111 A1 | 10/2005 | Bhandaru et al. |
| 2005/0239461 A1 | 10/2005 | Verma et al. |
| 2005/0240665 A1 | 10/2005 | Gu et al. |
| 2005/0243737 A1 | 11/2005 | Dooley et al. |
| 2005/0245258 A1 | 11/2005 | Classon et al. |
| 2005/0245269 A1 | 11/2005 | Demirhan et al. |
| 2005/0259597 A1 | 11/2005 | Benedetotto et al. |
| 2005/0259611 A1 | 11/2005 | Bhagwat et al. |
| 2005/0265321 A1 | 12/2005 | Rappaport et al. |
| 2005/0270992 A1 | 12/2005 | Sanzgiri et al. |
| 2005/0273442 A1 | 12/2005 | Bennett |
| 2005/0276218 A1* | 12/2005 | Ooghe et al. .................. 370/229 |
| 2005/0286466 A1 | 12/2005 | Tagg et al. |
| 2006/0030290 A1 | 2/2006 | Rudolf et al. |
| 2006/0035662 A1* | 2/2006 | Jeong et al. ................... 455/525 |
| 2006/0039395 A1* | 2/2006 | Perez-Costa et al. ......... 370/412 |
| 2006/0041683 A1 | 2/2006 | Subramanian et al. |
| 2006/0045050 A1 | 3/2006 | Floros et al. |
| 2006/0046744 A1 | 3/2006 | Dublish et al. |
| 2006/0050742 A1 | 3/2006 | Grandhi et al. |
| 2006/0073847 A1 | 4/2006 | Pirzada et al. |
| 2006/0094440 A1 | 5/2006 | Meier et al. |
| 2006/0098607 A1 | 5/2006 | Zeng et al. |
| 2006/0104224 A1 | 5/2006 | Singh et al. |
| 2006/0114872 A1 | 6/2006 | Hamada |
| 2006/0117174 A1* | 6/2006 | Lee ............................... 713/154 |
| 2006/0128415 A1 | 6/2006 | Horikoshi et al. |
| 2006/0143496 A1 | 6/2006 | Silverman |
| 2006/0152344 A1 | 7/2006 | Mowery |
| 2006/0160540 A1 | 7/2006 | Strutt et al. |
| 2006/0161983 A1 | 7/2006 | Cothrell et al. |
| 2006/0165103 A1* | 7/2006 | Trudeau et al. ............... 370/401 |
| 2006/0168383 A1* | 7/2006 | Lin ............................... 710/243 |
| 2006/0173844 A1 | 8/2006 | Zhang et al. |
| 2006/0174336 A1 | 8/2006 | Chen |
| 2006/0178168 A1 | 8/2006 | Roach |
| 2006/0182118 A1 | 8/2006 | Lam et al. |

| | | | | | | |
|---|---|---|---|---|---|---|
| 2006/0187878 A1 | 8/2006 | Calhoun et al. | | 2008/0102815 A1 | 5/2008 | Sengupta et al. |
| 2006/0189311 A1 | 8/2006 | Cromer et al. | | 2008/0107077 A1 | 5/2008 | Murphy |
| 2006/0190721 A1 | 8/2006 | Kawakami et al. | | 2008/0114784 A1 | 5/2008 | Murphy |
| 2006/0193258 A1 | 8/2006 | Ballai | | 2008/0117822 A1 | 5/2008 | Murphy et al. |
| 2006/0200862 A1 | 9/2006 | Olson et al. | | 2008/0130523 A1 | 6/2008 | Fridman et al. |
| 2006/0206582 A1 | 9/2006 | Finn | | 2008/0151844 A1 | 6/2008 | Tiwari |
| 2006/0215601 A1 | 9/2006 | Vieugels et al. | | 2008/0159319 A1 | 7/2008 | Gast et al. |
| 2006/0217131 A1 | 9/2006 | Alizadeh-Shabdiz et al. | | 2008/0162921 A1 | 7/2008 | Chesnutt et al. |
| 2006/0245393 A1 | 11/2006 | Bajic | | 2008/0220772 A1 | 9/2008 | Islam et al. |
| 2006/0248229 A1 | 11/2006 | Saunderson et al. | | 2008/0226075 A1 | 9/2008 | Gast |
| 2006/0248331 A1 | 11/2006 | Harkins | | 2008/0228942 A1 | 9/2008 | Lor et al. |
| 2006/0268696 A1 | 11/2006 | Konstantinov et al. | | 2008/0250496 A1 | 10/2008 | Namihira |
| 2006/0274774 A1 | 12/2006 | Srinivasan et al. | | 2008/0261615 A1 | 10/2008 | Kalhan |
| 2006/0276192 A1 | 12/2006 | Dutta et al. | | 2008/0276303 A1 | 11/2008 | Gast |
| 2006/0285489 A1 | 12/2006 | Francisco et al. | | 2009/0010206 A1 | 1/2009 | Giaretta et al. |
| 2006/0292992 A1 | 12/2006 | Tajima et al. | | 2009/0031044 A1 | 1/2009 | Barrack et al. |
| 2007/0002833 A1 | 1/2007 | Bajic | | 2009/0046688 A1 | 2/2009 | Volpi et al. |
| 2007/0008884 A1 | 1/2007 | Tang | | 2009/0059930 A1 | 3/2009 | Ryan et al. |
| 2007/0010248 A1 | 1/2007 | Dravida et al. | | 2009/0067436 A1 | 3/2009 | Gast |
| 2007/0011318 A1 | 1/2007 | Roth | | 2009/0073905 A1 | 3/2009 | Gast |
| 2007/0025265 A1 | 2/2007 | Porras et al. | | 2009/0131082 A1 | 5/2009 | Gast |
| 2007/0025306 A1 | 2/2007 | Cox et al. | | 2009/0198999 A1 | 8/2009 | Harkins |
| 2007/0027964 A1 | 2/2007 | Herrod et al. | | 2009/0247103 A1 | 10/2009 | Aragon |
| 2007/0054616 A1 | 3/2007 | Culbert | | 2009/0252120 A1 | 10/2009 | Kim et al. |
| 2007/0058598 A1 | 3/2007 | Ling | | 2009/0257437 A1 | 10/2009 | Tiwari |
| 2007/0064673 A1 | 3/2007 | Bhandaru et al. | | 2009/0260083 A1 | 10/2009 | Szeto et al. |
| 2007/0064718 A1 | 3/2007 | Ekl et al. | | 2009/0274060 A1 | 11/2009 | Taylor |
| 2007/0067823 A1 | 3/2007 | Shim et al. | | 2009/0287816 A1 | 11/2009 | Matta et al. |
| 2007/0070937 A1 | 3/2007 | Demirhan et al. | | 2009/0293106 A1 | 11/2009 | Peden, II et al. |
| 2007/0076694 A1 | 4/2007 | Iyer et al. | | 2010/0002610 A1 | 1/2010 | Bowser et al. |
| 2007/0081477 A1 | 4/2007 | Jakkahalli et al. | | 2010/0024007 A1 | 1/2010 | Gast |
| 2007/0082677 A1 | 4/2007 | Donald Hart et al. | | 2010/0040059 A1 | 2/2010 | Hu |
| 2007/0083924 A1 | 4/2007 | Lu | | 2010/0067379 A1 | 3/2010 | Zhao et al. |
| 2007/0086378 A1 | 4/2007 | Matta et al. | | 2010/0142478 A1 | 6/2010 | Forssell et al. |
| 2007/0086397 A1 | 4/2007 | Taylor | | 2010/0159827 A1 | 6/2010 | Rhodes et al. |
| 2007/0086398 A1 | 4/2007 | Tiwari | | 2010/0172276 A1 | 7/2010 | Aragon |
| 2007/0091845 A1 | 4/2007 | Brideglall | | 2010/0180016 A1 | 7/2010 | Bugwadia et al. |
| 2007/0091889 A1 | 4/2007 | Xiao et al. | | 2010/0195549 A1 | 8/2010 | Aragon et al. |
| 2007/0098086 A1 | 5/2007 | Bhaskaran | | 2010/0261475 A1 | 10/2010 | Kim et al. |
| 2007/0104197 A1 | 5/2007 | King | | 2010/0271188 A1 | 10/2010 | Nysen |
| 2007/0106776 A1 | 5/2007 | Konno et al. | | 2010/0329177 A1 | 12/2010 | Murphy et al. |
| 2007/0109991 A1 | 5/2007 | Bennett | | 2011/0128858 A1 | 6/2011 | Matta et al. |
| 2007/0110035 A1 | 5/2007 | Bennett | | 2011/0158122 A1 | 6/2011 | Murphy et al. |
| 2007/0115842 A1 | 5/2007 | Matsuda et al. | | 2011/0255466 A1 | 10/2011 | Gast et al. |
| 2007/0133494 A1 | 6/2007 | Lai et al. | | 2012/0140705 A1 | 6/2012 | Matta et al. |
| 2007/0135159 A1 | 6/2007 | Sinivaara | | | | |
| 2007/0135866 A1 | 6/2007 | Baker et al. | | | | |
| 2007/0136372 A1* | 6/2007 | Proctor et al. ............ 707/104.1 | | | | |
| 2007/0150945 A1 | 6/2007 | Whitaker et al. | | | | |
| 2007/0160046 A1 | 7/2007 | Matta | | | | |
| 2007/0171909 A1* | 7/2007 | Pignatelli ..................... 370/392 | | | | |
| 2007/0183375 A1 | 8/2007 | Tiwari | | | | |
| 2007/0183402 A1 | 8/2007 | Bennett | | | | |
| 2007/0189222 A1 | 8/2007 | Kolar et al. | | | | |
| 2007/0195793 A1 | 8/2007 | Grosser et al. | | | | |
| 2007/0230457 A1 | 10/2007 | Kodera et al. | | | | |
| 2007/0248009 A1 | 10/2007 | Petersen | | | | |
| 2007/0253380 A1 | 11/2007 | Jollota et al. | | | | |
| 2007/0255116 A1 | 11/2007 | Mehta et al. | | | | |
| 2007/0258448 A1 | 11/2007 | Hu | | | | |
| 2007/0260720 A1 | 11/2007 | Morain | | | | |
| 2007/0268506 A1 | 11/2007 | Zeldin | | | | |
| 2007/0268514 A1 | 11/2007 | Zeldin et al. | | | | |
| 2007/0268515 A1 | 11/2007 | Freund et al. | | | | |
| 2007/0268516 A1 | 11/2007 | Bugwadia et al. | | | | |
| 2007/0286208 A1 | 12/2007 | Kanada et al. | | | | |
| 2007/0287390 A1 | 12/2007 | Murphy et al. | | | | |
| 2007/0291689 A1 | 12/2007 | Kapur et al. | | | | |
| 2007/0297329 A1* | 12/2007 | Park et al. .................. 370/230.1 | | | | |
| 2008/0002588 A1 | 1/2008 | McCaughan et al. | | | | |
| 2008/0008117 A1 | 1/2008 | Alizadeh-Shabdiz | | | | |
| 2008/0013481 A1 | 1/2008 | Simons et al. | | | | |
| 2008/0014916 A1 | 1/2008 | Chen | | | | |
| 2008/0031257 A1 | 2/2008 | He | | | | |
| 2008/0039114 A1 | 2/2008 | Phatak et al. | | | | |
| 2008/0056200 A1 | 3/2008 | Johnson | | | | |
| 2008/0056211 A1 | 3/2008 | Kim et al. | | | | |
| 2008/0064356 A1 | 3/2008 | Khayrallah | | | | |
| 2008/0080441 A1 | 4/2008 | Park et al. | | | | |

FOREIGN PATENT DOCUMENTS

| | | |
|---|---|---|
| EP | 1542 409 A1 | 6/2005 |
| GB | 2 329 801 A | 3/1999 |
| GB | 2429080 A | 2/2007 |
| JP | 2000-215169 A1 | 8/2000 |
| JP | 2003-234751 A1 | 8/2003 |
| JP | 2003274454 | 9/2003 |
| JP | 2004-032525 A | 1/2004 |
| WO | WO94/03986 | 2/1994 |
| WO | WO99/11003 | 3/1999 |
| WO | WO 00/06271 A1 | 2/2000 |
| WO | WO 00/18148 | 3/2000 |
| WO | WO 02/089442 A1 | 11/2002 |
| WO | WO 03/085544 A1 | 10/2003 |
| WO | WO 2004/013986 A1 | 2/2004 |
| WO | WO 2004/095192 A2 | 11/2004 |
| WO | WO 2004/095800 A1 | 11/2004 |
| WO | WO 2006/014512 A2 | 2/2006 |
| WO | WO 2010/130133 A1 | 11/2010 |

OTHER PUBLICATIONS

U.S. Appl. No. 11/592,891, filed Nov. 2006, Murphy, James.
U.S. Appl. No. 11/595,119, filed Nov. 2006, Murphy, James.
U.S. Appl. No. 11/604,075, filed Nov. 2006, Murphy et al.
U.S. Appl. No. 11/643,329, filed Dec. 2006, Towari, Manish.
U.S. Appl. No. 11/648,359, filed Dec. 2006, Gast et al.
U.S. Appl. No. 11/690,954, filed Mar. 2007, Keenly et al.
U.S. Appl. No. 11/801,964, filed May 2007, Simone et al.
U.S. Appl. No. 11/852,234, filed Sep. 2007, Gast et al.
U.S. Appl. No. 11/944,346, filed Nov. 2007, Gast, Matthew S.
U.S. Appl. No. 11/966,912, filed Dec. 2007, Chesnutt et al.
U.S. Appl. No. 11/970,484, filed Jan. 2008, Gast, Matthew S.

U.S. Appl. No. 11/975,134, filed Oct. 2007, Aragon et al.
U.S. Appl. No. 12/077,051, filed Mar. 2008, Gast, Matthew S.
Puttini, R., Percher, J., Me, L., and de Sousa, R. 2004. A fully distributed IDS for MANET. In *Proceedings of the Ninth international Symposium on Computers and Communications* 2004 vol. 2 (ISCC''04)—vol. 02 (Jun. 28-Jul. 1, 2004). ISCC. IEEE Computer Society, Washington, DC, 331-338.
U.S. Appl. No. 11/326,966, filed Jan. 2006, Taylor.
U.S. Appl. No. 11/330,877, filed Jan. 2006, Matta.
U.S. Appl. No. 11/331,789, filed Jan. 2006, Matta, et al.
U.S. Appl. No. 11/351,104, filed Feb. 2006, Tiwari.
U.S. Appl. No. 11/377,859, filed Mar. 2006, Harkins.
U.S. Appl. No. 11/400,165, filed Apr. 2006, Tiwari.
U.S. Appl. No. 11/445,750, filed May 2006, Matta.
U.S. Appl. No. 11/417,830, filed May 2006, Morain.
U.S. Appl. No. 11/417,993, filed May 2006, Jar et al.
U.S. Appl. No. 11/437,537, filed May 2006, Freund et al.
U.S. Appl. No. 11/437,538, filed May 2006, Zeldin.
U.S. Appl. No. 11/437,387, filed May 2006, Zeldin et al.
U.S. Appl. No. 11/437,582, filed May 2006, Bugwadia et al.
U.S. Appl. No. 11/451,704, filed Jun. 2006, Riley.
Acampora and Winters, IEEE Communications Magazine, 25(8):11-20 (1987).
Acampora and Winters, IEEE Journal on selected Areas in Communications. SAC-5:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the 13$^{th}$ Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems, Proceedings 1977 Carnahan Conference on Crime Countermeasures", Apr. 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).

Ullmo et al., "Wireless Propagation in Buildings: A Statistic Scattering Approach", IEEE Transactions on Vehicular Technology, vol. 48, No. 3, May 1999.
Puttini, R., Percher, J., Me, L., and de Sousa, R. 2004. A fully distributed IDS for MAN ET. In Proceedings of the Ninth international Symposium on Computers and Communications 2004 vol. 2 (Iscc''04)—vol. 02 (Jun. 28-Jul. 1, 2004). ISCC. IEEE Computer Society, Washington, DC, 331-338.
Law, A., "New Service Discovery Protocol," Internet Citation [Online] XP002292473 Retrieved from the Internet: URL:/http://sern.uccalgary.ca/{ lawa/SENG60921/arch/SDP.htm> [retrieved Aug. 12, 2004] the whole document.
International Search Report PCT/US2008/010708 dated May 18, 2009; p. 1-2.
International Search Report PCT/US2007/19696 dated Feb. 29, 2008; p. 1.
Non-Final Office Action Mailed Jun. 1, 2010, in Co-pending U.S. Appl. No. 12/172,195, filed Jul. 11, 2008.
Notice of Allowanced mailed Jun. 23, 2010, in Co-pending U.S. Appl. No. 11/648,359, filed Dec. 28, 2006.
Non-Final Office Action Mailed May 14, 2010, in Co-pending U.S. Appl. No. 11/845,029, filed Aug. 24, 2007.
P. Martinez, M. Brunner, J. Quittek, F. Straus, J. Schonwlder, S. Mertens, T. Klie "Using the Script MIB for Policy-based Configuration Management", Technical University Braunschweig, Braunschweig, Germany, 2002.
P. Bahl et al., Radar: An In-Building RF-based User Location and Tracking System, Microsoft Research, Mar. 2000, 10 pages.
Latvala J. et al., Evaluation of RSSI-Based Human Tracking, Proceedings for the 2000 European Signal Processing Conference, Sep. 2000, 9 pages.
Bahl P. et al. "User Location and Tracking in an In-Building Radio Network," Microsoft Research, Feb. 1999, 13 pages.
P. Bahl et al., A Software System for Locating Mobile Users: Design, Evaluation, and Lessons, Microsoft Research, Feb. 1999, 13 pages.
Chen, Yen-Chen et al., "Enabling Location-Based Services on Wireless LANs", Networks, 2003. ICON2003. The 11th IEEE International Conference, Sep. 28-Oct. 1, 2003, pp. 567-572.
Erten, Y. Murat, "A Layered Security Architecture for Corporate 802.11 Wireless Networks", Wireless Telecommunications Symposium, May 14-15, 2004, pp. 123-128.
Kleine-Ostmann, T., et al., "A Data Fusion Architecture for Enhanced Position Estimation in Wireless Networks," IEEE Communications Letters, vol. 5(8), Aug. 2001, p. 343-345.
Pulson, Time Domain Corporation, Ultra wideband (UWB) Radios for Precision Location, Third IEEE Workshop on Wireless Local Area Networks, Sep. 27-28, 2001, 8 pages.
Barber, S., Monitoring 802.1 Networks, IEEE 802.11, Sydney, NSW, May 13-17, 2002.
Latvala, J. et al. "Patient Tracking in a Hospital Environment Using Extended Kalman-filtering," Proceedings of the 1999 Middle East Conference on Networking, Nov. 1999, 5 pages.
Myllymaki, P. et al., "A Probabilistic Approach to WLAN User Location Estimation," Third IEEE Workshop on Wireless Local Area Networks, Sep. 27-28, 2001, 12 pages.
Potter, B., and Fleck, B., 802.11 Security, O'Reilly Media Inc., Dec. 2002, 14 pages.
McCann, S., et al., "Emergency Services for 802," IEEE 802.11-07/0505r1, Mar. 2007, 27 pages.
Di Sorte, D., et al., "On the Performance of Service Publishing in IEEE 802.11 Multi-Access Environment," IEEE Communications Letters, vol. 11, No. 4, Apr. 2007, 3 pages.
Microsoft Computer Dictionary, Fifth Edition, Microsoft Corporation, 2002, 2 pages.
Thomson, Allan, Cisco Systems, AP Power Down Notification, Power Point slide show; IEEE standards committee meeting Jul. 15, 2008; doc.: IEEE 802.11-08/0759r0, 14 pages.
3COM, Wireless LAN Mobility System: Wireless LAN Switch and Controller Configuration Guide, 3COM, Revision A, Oct. 2004, 476 pages.
3COM, Wireless LAN Switch Manager (3WXM), 3COM, Revision C, Oct. 2004, 8 pages.

3COM, Wireless LAN Switch and Controller; Quick Start Guide, 3COM, Revision B, Nov. 2004, 10 pages.
3COM, Wireless LAN Mobility System; Wireless LAN Switch and Controller Installation and Basic Configuration Guide, Revision B, Apr. 2005, 496 pages.
Johnson, David B, et al., "DSR The Dynamic Source Routing Protocol for Multi-Hop Wireless Ad Hoc Networks," Computer Science Department, Carnegie Mellon University, Nov. 3, 2005 (http://monarch.cs.rice.edu/monarch-papers/dsr-chapter00.pdf).
Information Sciences Institute, RFC-791—Internet Protocol, DARPA, Sep. 1981.
Aerohive Blog, posted by Devin Akin, Cooperative Control: Part 3, [Online] Retrieved from the Internet: <URL: http://blog.aerohive.com/blog/?p=71> Mar. 1, 2010 (3 pages).
Wikipedia, Wireless LAN, 2 definitions for wireless LAN roaming, [Online] [retrieved Oct. 4, 2010] Retrieved from the Internet: <URL: http://en.wikipedia.org/wiki/Wireless_LAN> (1 page).
U.S. Appl. No. 12/957,997, filed Dec. 1, 2010.
U.S. Appl. No. 12/603,391, filed Oct. 21, 2009.
U.S. Appl. No. 12/763,057, filed Apr. 19, 2010.
U.S. Appl. No. 09/866,474, filed May 29, 2001.
U.S. Appl. No. 13/017,801, filed Jan. 31, 2011.
Office Action for U.S. Appl. No. 11/784,307, mailed Sep. 22, 2009.
Final Office Action for U.S. Appl. No. 11/784,307, mailed Jun. 14, 2010.
Non-Final Office Action for U.S. Appl. No. 11/377,859, mailed Jan. 8, 2008.
Final Office Action for U.S. Appl. No. 11/377,859, mailed Aug. 27, 2008.
Office Action for U.S. Appl. No. 12/401,073, mailed Aug. 23, 2010.
Final Office Action for U.S. Appl. No. 12/401,073, mailed Apr. 1, 2011.
Office Action for U.S. Appl. No. 12/401,073, mailed Sep. 20, 2011.
Office Action for U.S. Appl. No. 11/326,966, mailed Nov. 14, 2008.
Office Action for U.S. Appl. No. 12/500,392, mailed Jun. 20, 2011.
Office Action for U.S. Appl. No. 11/400,165, mailed Aug. 19, 2008.
Office Action for U.S. Appl. No. 12/489,295, mailed Apr. 27, 2011.
Final Office Action for U.S. Appl. No. 12/489,295, mailed Jan. 18, 2012.
Office Action for U.S. Appl. No. 11/330,877, mailed Sep. 11, 2008.
Final Office Action for U.S. Appl. No. 11/330,877, mailed Mar. 13, 2009.
Office Action for U.S. Appl. No. 11/330,877, mailed Aug. 6, 2009.
Final Office Action for U.S. Appl. No. 11/330,877, mailed Apr. 22, 2010.
Office Action for U.S. Appl. No. 11/330,877, mailed Jan. 13, 2011.
Final Office Action for U.S. Appl. No. 11/330,877, mailed May 27, 2011.
Office Action for U.S. Appl. No. 11/351,104, mailed Oct. 28, 2008.
Office Action for U.S. Appl. No. 11/351,104, mailed Dec. 2, 2009.
Final Office Action for U.S. Appl. No. 11/351,104, mailed Jun. 10, 2009.
Office Action for U.S. Appl. No. 11/351,104, mailed May 26, 2010.
Office Action for U.S. Appl. No. 11/351,104, mailed Nov. 29, 2010.
Office Action for U.S. Appl. No. 11/351,104, mailed Jul. 26, 2011.
Office Action for U.S. Appl. No. 11/437,537, mailed Dec. 23, 2008.
Final Office Action for U.S. Appl. No. 11/437,537, mailed Jul. 16, 2009.
Office Action for U.S. Appl. No. 11/331,789, mailed Jun. 13, 2008.
Final Office Action for U.S. Appl. No. 11/331,789, mailed Oct. 23, 2008.
Office Action for U.S. Appl. No. 11/331,789, mailed Aug. 5, 2009.
Office Action for U.S. Appl. No. 12/785,362, mailed Apr. 22, 2011.
Office Action for U.S. Appl. No. 11/417,830, mailed Nov. 14, 2008.
Final Office Action for U.S. Appl. No. 11/417,830, mailed May 28, 2009.
Office Action for U.S. Appl. No. 11/417,993, mailed Oct. 29, 2008.
Office Action for U.S. Appl. No. 12/370,562, mailed Sep. 30, 2010.
Office Action for U.S. Appl. No. 12/370,562, mailed Apr. 6, 2011.
Office Action for U.S. Appl. No. 12/370,562, mailed Jan. 17, 2012.
Office Action for U.S. Appl. No. 11/592,891, mailed Jan. 15, 2009.
Final Office Action for U.S. Appl. No. 11/592,891, mailed Jul. 20, 2009.
Office Action for U.S. Appl. No. 11/595,119, mailed Jul. 21, 2009.
Final Office Action for U.S. Appl. No. 11/595,119, mailed Jan. 5, 2010.
Office Action for U.S. Appl. No. 11/595,119, mailed Aug. 19, 2010.
Final Office Action for U.S. Appl. No. 11/595,119, mailed Aug. 2, 2011.
Office Action for U.S. Appl. No. 11/604,075, mailed May 3, 2010.
Office Action for U.S. Appl. No. 11/437,538, mailed Dec. 22, 2008.
Final Office Action for U.S. Appl. No. 11/437,538, mailed Jun. 10, 2009.
Office Action for U.S. Appl. No. 11/437,387, mailed Dec. 23, 2008.
Final Office Action for U.S. Appl. No. 11/437,387, mailed Jul. 15, 2009.
Office Action for U.S. Appl. No. 11/437,582, mailed Jan. 8, 2009.
Final Office Action for U.S. Appl. No. 11/437,582, mailed Jul. 22, 2009.
Office Action for U.S. Appl. No. 12/683,281, mailed Jan. 20, 2012.
Office Action for U.S. Appl. No. 11/801,964, mailed Sep. 17, 2010.
Final Office Action for U.S. Appl. No. 11/801,964, mailed May 11, 2011.
Office Action for U.S. Appl. No. 12/304,100, mailed Jun. 17, 2011.
Office Action for U.S. Appl. No. 11/487,722, mailed Aug. 7, 2009.
Office Action for U.S. Appl. No. 11/643,329, mailed Jul. 9, 2010.
Office Action for U.S. Appl. No. 11/648,359, mailed Nov. 19, 2009.
Office Action for U.S. Appl. No. 11/944,346, mailed Nov. 23, 2010.
Office Action for U.S. Appl. No. 12/077,051, mailed Dec. 28, 2010.
Final Office Action for U.S. Appl. No. 12/077,051, mailed Oct. 25, 2011.
Office Action for U.S. Appl. No. 12/113,535, mailed Apr. 21, 2011.
Final Office Action for U.S. Appl. No. 12/113,535, mailed Jan. 3, 2012.
Office Action for U.S. Appl. No. 11/852,234, mailed Jun. 29, 2009.
Office Action for U.S. Appl. No. 11/852,234, mailed Jan. 21, 2010.
Office Action for U.S. Appl. No. 11/852,234, mailed Aug. 9, 2010.
Office Action for U.S. Appl. No. 11/852,234, mailed Apr. 27, 2011.
Final Office Action for U.S. Appl. No. 11/852,234, mailed Jan. 20, 2012.
Office Action for U.S. Appl. No. 11/970,484, mailed Nov. 24, 2010.
Final Office Action for U.S. Appl. No. 11/970,484, mailed Jul. 22, 2011.
Office Action for U.S. Appl. No. 12/172,195, mailed Jun. 1, 2010.
Office Action for U.S. Appl. No. 12/172,195, mailed Nov. 12, 2010.
Office Action for U.S. Appl. No. 12/336,492, mailed Sep. 15, 2011.
Office Action for U.S. Appl. No. 12/210,917, mailed Nov. 15, 2010.
Final Office Action for U.S. Appl. No. 12/210,917, mailed May 13, 2011.
Office Action for U.S. Appl. No. 12/210,917, mailed Dec. 5, 2011.
Office Action for U.S. Appl. No. 12/350,927, mailed Aug. 17, 2011.
Final Office Action for U.S. Appl. No. 12/350,927, mailed Jan. 18, 2012.
Office Action for U.S. Appl. No. 12/365,891, mailed Aug. 29, 2011.
Office Action for U.S. Appl. No. 10/235,338, mailed Jan. 8, 2003.
Office Action for U.S. Appl. No. 11/094,987, mailed Dec. 27, 2007.
Final Office Action for U.S. Appl. No. 11/094,987, mailed May 23, 2008.
Office Action for U.S. Appl. No. 11/094,987, mailed Oct. 21, 2008.
Office Action for U.S. Appl. No. 12/474,020, mailed Jun. 3, 2010.
Final Office Action for U.S. Appl. No. 12/474,020, mailed Oct. 4, 2010.
Office Action for U.S. Appl. No. 09/866,474, mailed Nov. 30, 2004.
Final Office Action for U.S. Appl. No. 09/866,474, mailed Jun. 10, 2005.
Office Action for U.S. Appl. No. 10/667,027, mailed Jul. 29, 2005.
Final Office Action for U.S. Appl. No. 10/667,027, mailed Mar. 10, 2006.
Office Action for U.S. Appl. No. 10/667,027, mailed May 5, 2006.
Final Office Action for U.S. Appl. No. 10/667,027, mailed Feb. 26, 2007.
Office Action for U.S. Appl. No. 10/666,848, mailed Mar. 22, 2007.
Office Action for U.S. Appl. No. 10/667,136, mailed Jan. 25, 2006.
Office Action for U.S. Appl. No. 10/667,136, mailed Aug. 28, 2006.
Final Office Action for U.S. Appl. No. 10/667,136, mailed Mar. 9, 2007.

International Search Report and Written Opinion for PCT/US05/004702, mailed Aug. 10, 2006.
International Search Report and Written Opinion for PCT/US2006/009525, mailed Sep. 13, 2007.
International Search Report and Written Opinion for PCT/US06/40500, mailed Aug. 17, 2007.
International Search Report and Written Opinion for PCT/US06/40498, mailed Dec. 28, 2007.
International Search Report and Written Opinion for PCT/US2007/012194 dated Feb. 4, 2008.
International Search Report and Written Opinion for PCT/US06/40499, mailed Dec. 13, 2007.
International Search Report and Written Opinion for PCT/US2007/12016, mailed Jan. 4, 2008.
International Search Report and Written Opinion for PCT/US2007/012195, mailed Mar. 19, 2008.
International Search Report and Written Opinion for PCT/US07/013758 mailed Apr. 3, 2008.
First Office Action for Chinese Application No. 2007800229623.X, mailed Dec. 31, 2010.
International Search Report and Written Opinion for PCT/US07/013757, mailed Jan. 22, 2008.
International Search Report and Written Opinion for PCT/US07/14847, mailed Apr. 1, 2008.
International Search Report and Written Opinion for PCT/US07/089134, mailed Apr. 10, 2008.
International Search Report and Written Opinion for PCT/US2008/010708, mailed May 18, 2009.
Office Action for Canadian Application No. 2,638,754, mailed Oct. 3, 2011.
Supplementary Partial European Search Report for European Application No. 02770460, mailed Aug. 20, 2004.
Supplementary Partial European Search Report for European Application No. 02770460, mailed Dec. 15, 2004.
Examination Report for European Application No. 02770460, Mar. 18, 2005.
Summons for Oral Hearing Proceedings for European Application No. 02770460, Jan. 31, 2006.
International Search Report for PCT/US02/28090, mailed Aug. 13, 2003.
International Preliminary Examination Report for PCT/US02/28090, mailed Oct. 29, 2003.
Examination Report for European Application No. 06006504, mailed Oct. 10, 2006.
English Translation of Office Action for Japanese Application No. 2006-088348, mailed Jan. 4, 2011.
International Search Report and Written Opinion for PCT/US04/30769, mailed Oct. 4, 2005.
International Search Report and Written Opinion for PCT/US04/30683, mailed Feb. 10, 2006.
International Search Report and Written Opinion for PCT/US04/30684, mailed Feb. 10, 2006.
Sangheon Pack et al. "Fast-handoff support in IEEE 802.11 wireless networks," IEEE Communications Surveys, IEEE, NY, NY, vol. 9, No. 1, Jan. 1, 2007 (pp. 2-12) ISSN: 1553-877X.
U.S. Appl. No. 13/437,669, filed Apr. 2, 2012.
U.S. Appl. No. 13/437,673, filed Apr. 2, 2012.
Office Action for U.S. Appl. No. 11/351,104, mailed Feb. 15, 2012.
Office Action for U.S. Appl. No. 13/396,124, mailed May 7, 2012.
Office Action for U.S. Appl. No. 13/437,669, mailed May 30, 2012.
Office Action for U.S. Appl. No. 13/437,673, mailed May 30, 2012.
Final Office Action for U.S. Appl. No. 12/304,100, mailed Feb. 2, 2012.
Office Action for U.S. Appl. No. 12/304,100, mailed May 29, 2012.
Office Action for U.S. Appl. No. 12/113,535, mailed Apr. 20, 2012.
Office Action for U.S. Appl. No. 11/970,484, mailed Jun. 20, 2012.
Final Office Action for U.S. Appl. No. 12/336,492, mailed Jun. 15, 2012.
Extended Search Report for European Application No. 11188566.1, mailed Jan. 30, 2012.
Second Office Action for Chinese Application No. 200780029623.X, mailed Mar. 7, 2012.
Extended Supplementary European Search Report for Application No. 07796005.2, mailed Feb. 14, 2012.

* cited by examiner

QUALITY OF SERVICE PROVISIONING FOR WIRELESS NETWORKS

RELATED APPLICATIONS

This application claims priority to U.S. Provisional Patent Application No. 60/845,147, filed Sep. 15, 2006, and entitled "Quality of Service Provisioning For Wireless Networks" by Matthew Stuart Gast, which is incorporated herein by reference.

BACKGROUND

Wireless networks are frequently governed by 802.11 standards. While not all networks need to use all of the standards associated with 802.11, a discussion of the standards by name, such as 802.11e provides, at least partly because the standards are well-known and documented, a useful context in which to describe issues as they relate to wireless systems.

There is only one 802.11 standard, however under the revisions introduced by 802.11e current implementations of QoS specifications typically perform one or more of the following. Mapping to a Wi-Fi Multimedia (WMM) access class by mapping an entire service set identifier (SSID), writing a cumbersome access control list (ACL), or automatically mapping DiffServ Code Point bits. Nothing within 802.11e or WMM addresses dynamic assignment of QoS to frames. Thus, QoS parameters are provisioned in a static manner.

The foregoing examples of the related art and limitations related therewith are intended to be illustrative and not exclusive. For Example, wireless clients may use different protocols other than 802.11e, potentially including protocols that have not yet been developed. However, problems associated with QoS may persist. Other limitations of the relevant art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for QoS provisioning includes provisioning QoS parameters dynamically. The dynamic provisioning may be part of authentication of a system to a wireless network. The technique may or may not be compatible with 802.11e and WMM concepts, and provide ways to dynamically configure QoS features on a per-client basis.

In a non-limiting example, consider a phone, and a laptop. Each may request use of a wireless network that operates in accordance with QoS. The phone may operate a soft phone application and transmit voice data over a network, whereas, for this example only, that the laptop does not. The phone and the laptop may each request a high priority access class in order to transmit data. Each of the phone and the laptop may or may not be validated as a part of authentication. In validating, the soft phone may or may not be identified as an application that requires a high priority access class. In contrast, the laptop, which may have requested a high priority access class even though it may not be running a high priority application, may be denied the use of the high priority access class. QoS parameters may be dynamically created and provisioned. The dynamic assignment of the high priority access class may allow the phone to transmit data at high priority whereas the laptop may not.

These and other advantages will become apparent to those skilled in the relevant art upon a reading of the following descriptions and a study of the several examples of the drawings.

BRIEF DESCRIPTION OF THE DRAWINGS

Embodiments of the invention are illustrated in the figures. However, the embodiments and figures are illustrative rather than limiting; they provide examples of the inventions.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments.

Figure 1:
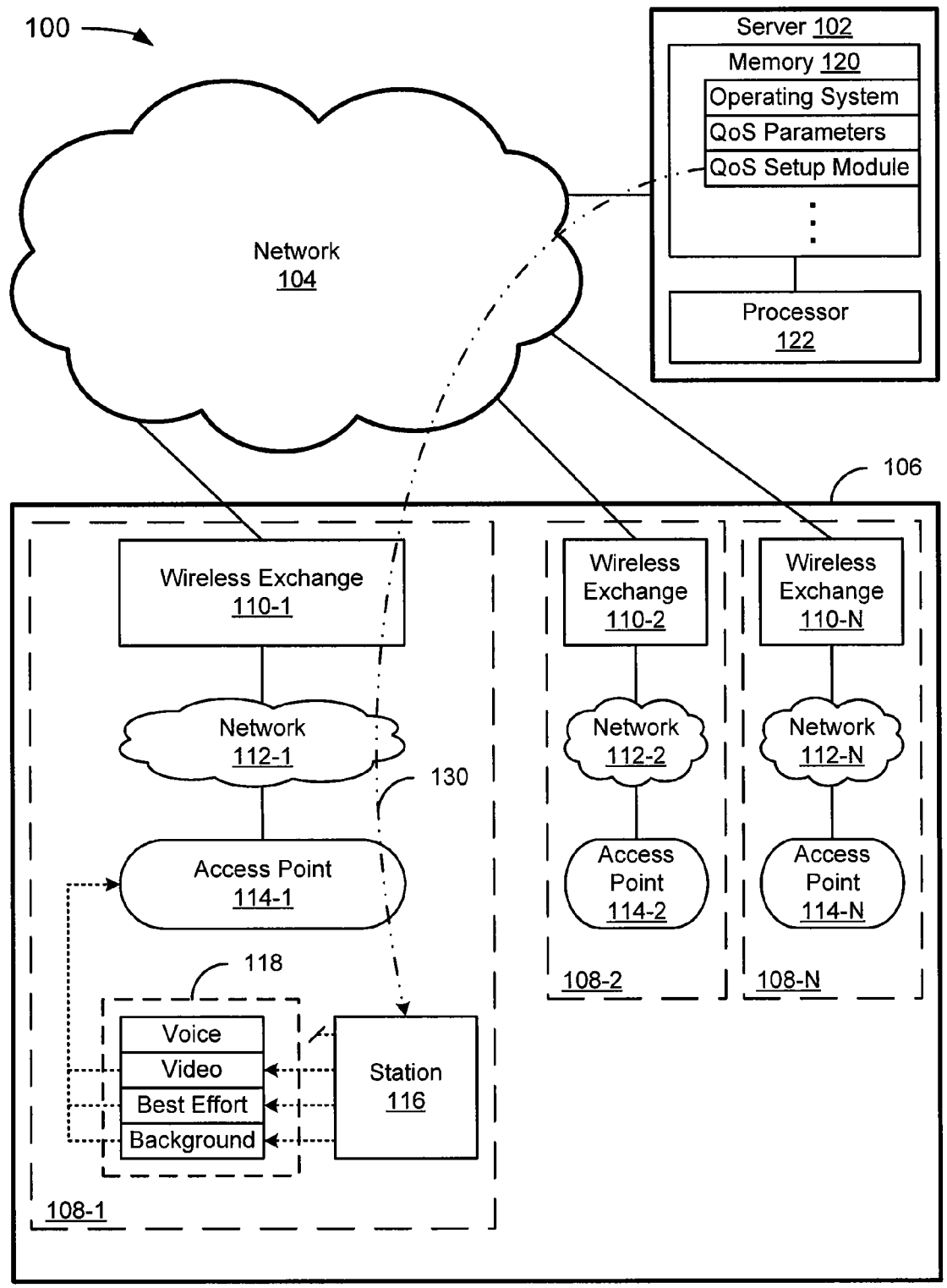
FIG. 1 depicts a diagram 100 of an example of a system including a wireless access domain.

FIG. 1 depicts a system 100 including a wireless access domain. The system 100 includes a server 102, a network 104, and a wireless access domain 106. The system 100 may or may not include multiple wireless access domains. The server 102 may be practically any type of device that is capable of communicating with a communications network, such as, by way of example but not limitation, a mainframe or a workstation. The network 104 may be practically any type of communications network, such as, by way of example but not limitation, the Internet or an infrastructure network. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

In a non-limiting embodiment, the server 102 may be running a program such as, by way of example but not limitation, ethereal, to decode, by way of example but not limitation, IEEE 802.11 standard packets encapsulated in TaZman Sniffer Protocol (TZSP) that are received from the wireless access domain 106. In a non-limiting embodiment, the server 102 is connected to a wireless backbone network (not shown), either directly or indirectly through a wireless network. The server 102 may include, by way of example but not limitation, a Remote Authentication Dial In User Services (RADIUS) server, an Lightweight Directory Access Protocol (LDAP) server, a policy server, a combination of these servers, or some other server.

In non-limiting embodiments, the wireless access domain 106 may be referred to as, by way of example but not limitation, a Local Area Network (LAN), virtual LAN (VLAN), and/or wireless LAN (WLAN). In an embodiment, the wireless access domain 106 may include one or more radios.

In the example of FIG. 1, the wireless access domain 106 includes access areas 108-1 to 108-N (hereinafter collectively referred to as access areas 108). The access areas 108 have characteristics that depend upon, among other things, a radio profile. A radio profile is a group of parameters such as, by way of example but not limitation, beacon interval, fragmentation threshold, and security policies. In an embodiment, the parameters may be configurable in common across a set of radios in one or more access areas 108. In another embodiment, a few parameters, such as the radio name and channel number, must be set separately for each radio. An example of the implementation of a wireless access domain, provided by way of example but not limitation, includes a Trapeze Networks "identity-aware" Mobility Domain™.

In the example of FIG. 1, the following elements are associated with each of the access areas 108: Wireless exchange switches 110-1 to 110-N (hereinafter collectively referred to as wireless exchange switches 110), networks 112-1 to 112-N (hereinafter collectively referred to as networks 112), and access points 114-1 to 114-N (hereinafter collectively referred to as access points 114).

In an embodiment, the wireless exchange switches 110 swap topology data and client information that details each user's identity, location, authentication state, VLAN membership, permissions, roaming history, bandwidth consumption, and/or other attributes assigned by, by way of example but not limitation, an Authentication, Authorization, and Accounting (AAA) backend (not shown). In an embodiment, the wireless exchange switches 110 provide forwarding, queuing, tunneling, and/or some security services for the information the wireless exchange switches 110 receive from their associated access points 114. In another embodiment, the wireless exchange switches 110 coordinate, provide power to, and/or manage the configuration of the associated access points 114. An implementation of a wireless exchange switch, provided by way of example but not limitation, includes a Trapeze Networks Mobility Exchange® switch. The Trapeze Networks Mobility Exchange® switches may, in another implementation, be coordinated by means of the Trapeze Access Point Access (TAPA) protocol.

In an embodiment, the networks 112 are simply wired connections from the wireless exchange switches 110 to the access points 114. The networks 112 may or may not be part of a larger network. In a non-limiting embodiment, the networks 112 provide a Layer 2 path for Layer 3 traffic, preserving IP addresses, sessions, and other wired Layer 3 attributes as users roam throughout the wireless access domain 106. By tunneling Layer 3 traffic at Layer 2, users stay connected with the same IP address and keep the same security and Quality of Service (QoS) policies from the wired network while they roam the wireless side.

In a non-limiting embodiment, the access points 114 are hardware units that act as a communication hub by linking wireless mobile stations such as PCs to a wired backbone network. In an embodiment, the access points 114 connect users to other users within the network and, in another embodiment, can serve as the point of interconnection between a WLAN and a fixed wire network. The number of users and size of a network help to determine how many access points are desirable for a given implementation. An implementation of an access point, provided by way of example but not limitation, includes a Trapeze Networks Mobility System® Mobility Point® (MP®) access point.

The access points 114 are stations that transmit and receive data (and may therefore be referred to as transceivers) using one or more radio transmitters. For example, an access point may have two associated radios, one which is configured for IEEE 802.11a standard transmissions, and the other which is configured for IEEE 802.11b standard transmissions. In a non-limiting embodiment, an access point transmits and receives information as radio frequency (RF) signals to and from a wireless client over a 10/100BASE-T Ethernet connection. The access points 114 transmit and receive information to and from their associated wireless exchange switches 110. Connection to a second wireless exchange switch provides redundancy.

A station, as used herein, may be referred to as a device with a media access control (MAC) address and a physical layer (PHY) interface to the wireless medium that comply with the IEEE 802.11 standard. As such, in a non-limiting embodiment, the access points 114 are stations. Similarly, a wireless client, such as the mobile device 116 of FIG. 1, may be implemented as a station. In alternative embodiments, a station may comply with a different standard than IEEE 802.11, and may have different interfaces to a wireless or other medium.

In the example of FIG. 1, the server 102 includes memory 120 and a processor 122. In the example of FIG. 1, the memory 120 includes an operating system, a QoS parameters database, and a QoS setup module. In operation, a policy configuration for the mobile device 116 includes setting or accepting QoS parameters for the mobile device 116 (or a user of the mobile device 116). The QoS setup module may provide the mobile device 116 with the policy configuration during association. In the example of FIG. 1, this QoS provisioning is illustrated by the arrow 130 from the QoS setup module to the mobile device 116.

In the example of FIG. 1, queues 118 are depicted for illustrative purposes (depending upon the implementation, the queues 118 may be considered a part of the access point 114-1). As is shown in the example of FIG. 1, the QoS provisioning 130 provides the mobile device 116 with access to background, best effort, and video queues, but no access to the high-priority voice queue. It should be noted that the policy could be configured to grant access to the high-priority voice queue if the mobile device 116 were running a VoIP application. However, for illustrative purposes, it is assumed that when the mobile device 116 was not running a VoIP application when it associated. Therefore, in the example of FIG. 1, access to the voice queue on the access point 114-1 is blocked.

If the user were allowed access to the voice queue (not shown) there could be an associated limit to voice traffic as well. For instance, a limit of 100 kbps on voice traffic could be employed to limit users to one active telephone call.

Figure 2A:
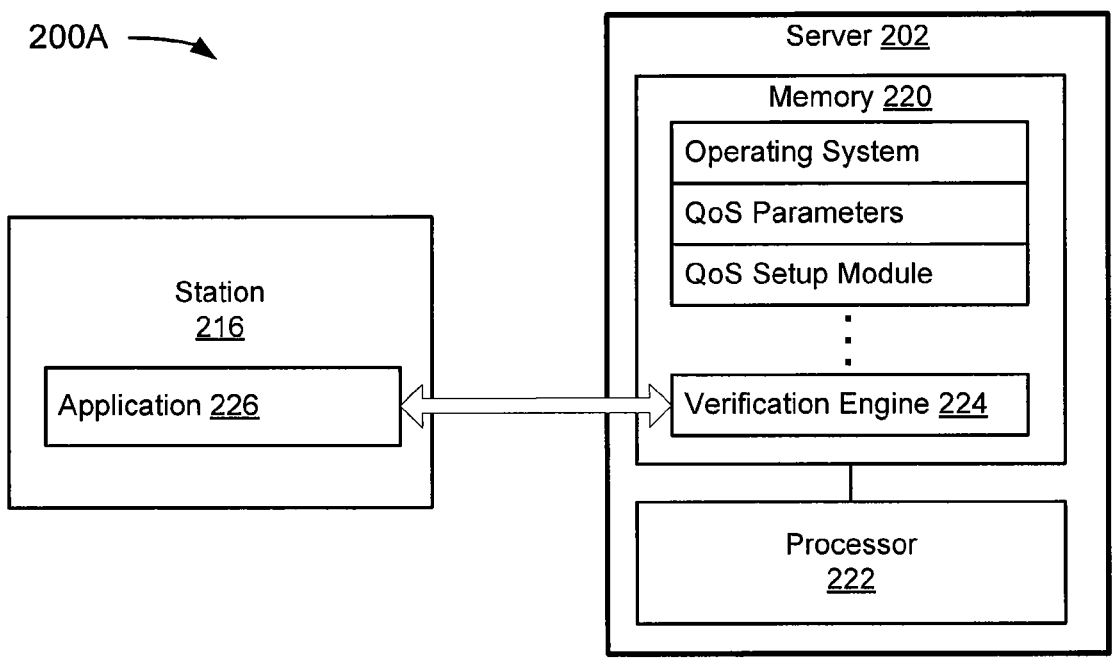
FIGS. 2A and 2B depict diagrams of examples of a system 200 including a verification engine.
Figure 2B:
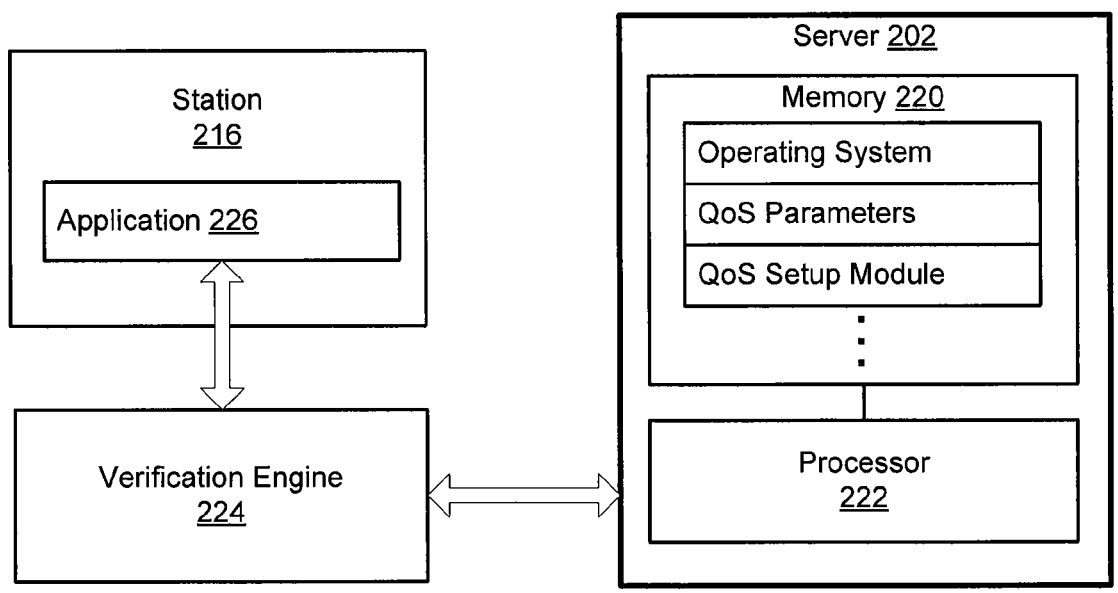

FIG. 2A and FIG. 2B depict diagrams of examples of a system including a verification engine. In the example of FIG. 2A, the system 200A includes sever 202 and station 216. The station 216 includes the application 226. The server 202 includes memory 220 and processor 222. The memory includes verification engine 224A, application 226. In the example of FIG. 2B, the system 200B includes server 202, station 216, and verification engine 224B. Notably, in this example, the verification engine 224B is not stored in the memory 220 of the server. Unless a distinction is needed, the verification engine 224A and 224B are referred to as verification engine 224.

In some embodiments, verification engine 224 determines whether or not a specific software application is executing on the station and instructs server 202 to deny the station use of a high priority data transmission queue if the software application is not executing on the station. Users naturally want the best service possible and will be tempted to try and move their best effort traffic into the voice and video queues. Using specifications like the Trusted Computing Group's Trusted Network Connect (TNC), a system can be "validated" before it is allowed to use the network. That validation may include verifying that a program requiring high priority access is running before allowing access to high-priority queues.

In a non-limiting example, a verification engine may allow access to the voice queue only if a softphone is running on the client computer. It is not necessary that the application be a phone. However, a softphone is an example of an application that requires high priority access to the network for transmission of data because a phone provides low quality service when it is unable to transmit data for even a short period of time. Contrarily, many applications may provide high quality service while only utilizing the best efforts access class. By dynamically provisioning QoS parameters, a station may be authenticated and provided high priority access. The station can then provide high quality service at the expense of a second station that is dynamically provision with only a lower priority access class, wherein the second station needs only the lower priority access class to provide high quality service. The station may then transmit data while the second station is required to wait.

In continuing the non-limiting example, a phone is an example of a station requiring high priority access and a laptop is an example of a station that may require only low priority access. Each may each request a high priority access class in order to transmit data, however, the laptop should be denied the high priority access because it cannot prove it needs a high priority access class. Each of the phone and the laptop may or may not be validated as a part of authentication. In validating, the soft phone may be identified as an application that requires a high priority access class because it runs an application that depends on high priority transmission of data, e.g. a soft phone. In contrast, the laptop, which may have requested a high priority access class even though it may not be running a high priority application, may be denied the use of the high priority access class. QoS parameters may be dynamically created and provisioned. The dynamic assignment of the high priority access class may allow the phone to transmit data at high priority whereas the laptop may not.

In some embodiments verification engine 224 may be a component of server 202 (FIG. 2A), or in some embodiments verification engine 224 may be a separate component coupled to server 202. It is not necessary that verification engine 224 be operating on the same hardware software, physical or logical unit as server. Those skilled in the art know that the components portrayed in this figure can be arbitrarily combined or divided into separate software, firmware and/or hardware components. Furthermore, such components, regardless of how they are combined or divided, can execute on the same computing device or multiple computing devices, and wherein the multiple computing devices can be connected by one or more networks.

Figure 3:
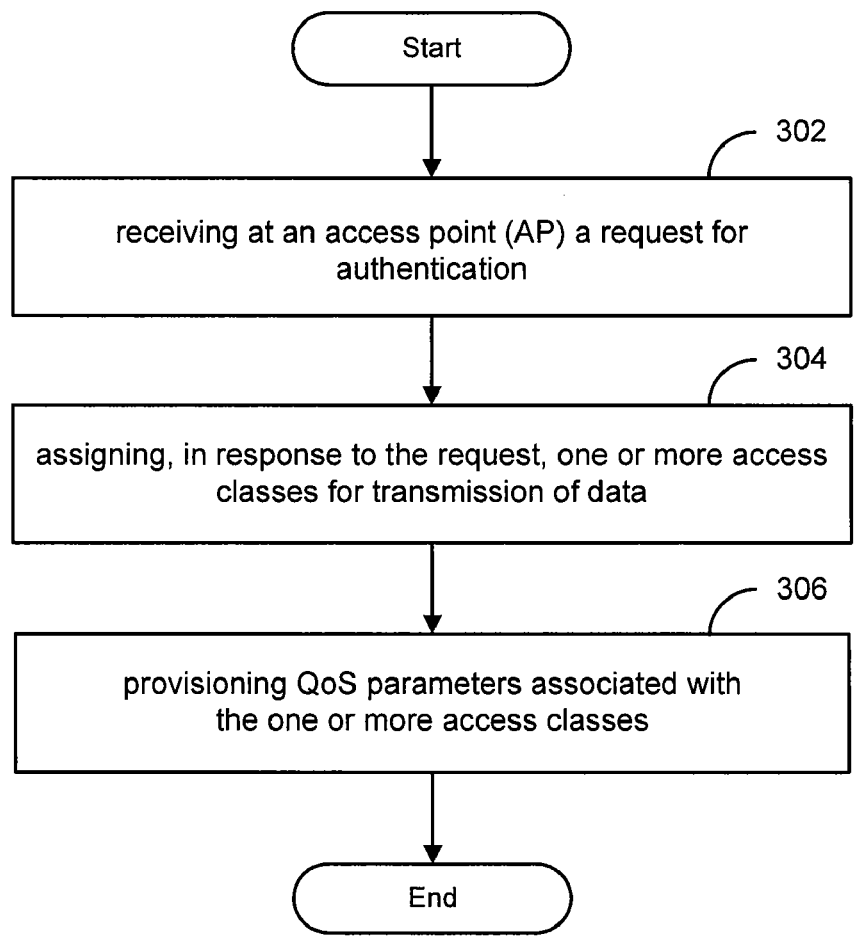
FIG. 3 depicts a flowchart 300 of an example of a method for dynamically provisioning QoS parameters.

FIG. 3 depicts a flowchart 300 of an example of a method for dynamically provisioning QoS parameters. The method is organized as a sequence of modules in the flowchart 300. However, it should be understood that these and other modules associated with other methods described herein may be reordered for parallel execution or into different sequences of modules.

In the example of FIG. 3 flowchart 300 starts at module 302 with receiving at an access point (AP) a request for authentication. The request may come from a station desiring to transmit data through the access point in accordance with an access class.

In some embodiments a capacity management and prioritization system may include a network system that takes into account the capacity of a particular access device as part of authentication. For example, a station that has requested QoS resources to which it is administratively allowed but are not available at the target access point might be redirected to a device at which those resources are available. Stations that are allowed on the network for best-effort service may initially be allowed on the network, but moved to a different access point when additional QoS is requested by, for example, a softphone.

In the example of FIG. 3, the flowchart continues to module 304 with assigning, in response to the request, one or more access classes for transmission of data. The access classes may or may not be one or more of a number of access classes defined in accordance with the Institute of Electrical and Electronics Engineers (IEEE) standard 802.11. In a non-limiting example, the classes specify voice, video, best effort, and background in order from highest to lowest priority. Each class is associated with a priority queue. The highest priority is assigned to voice data as it suffers in quality when access to the queue is unavailable. The lowest priority is assigned to background level data which does not tend to suffer when encountering traffic and being required to wait. Additionally, a queue can be reserved for sending signals controlling the network, wherein data in the queue supersedes all other data in priority.

In the example of FIG. 3, the flowchart continues to module 306 with provisioning QoS parameters associated with the one or more access classes. As discussed in reference to FIG. 1, the server provisions these parameters. One way of provisioning parameters is through a station switching record. In this way, the QoS parameters, including any limits set by the dynamic configuration, can be passed around the network in the station switching record.

In some embodiments QoS parameters can be stored in a Lightweight Directory Access Protocol (LDAP) directory associated with the security credentials for a telephone. In such an implementation, the network could, for example, perform an LDAP query against the telephone's account and make that part of the session record.

Figure 4:
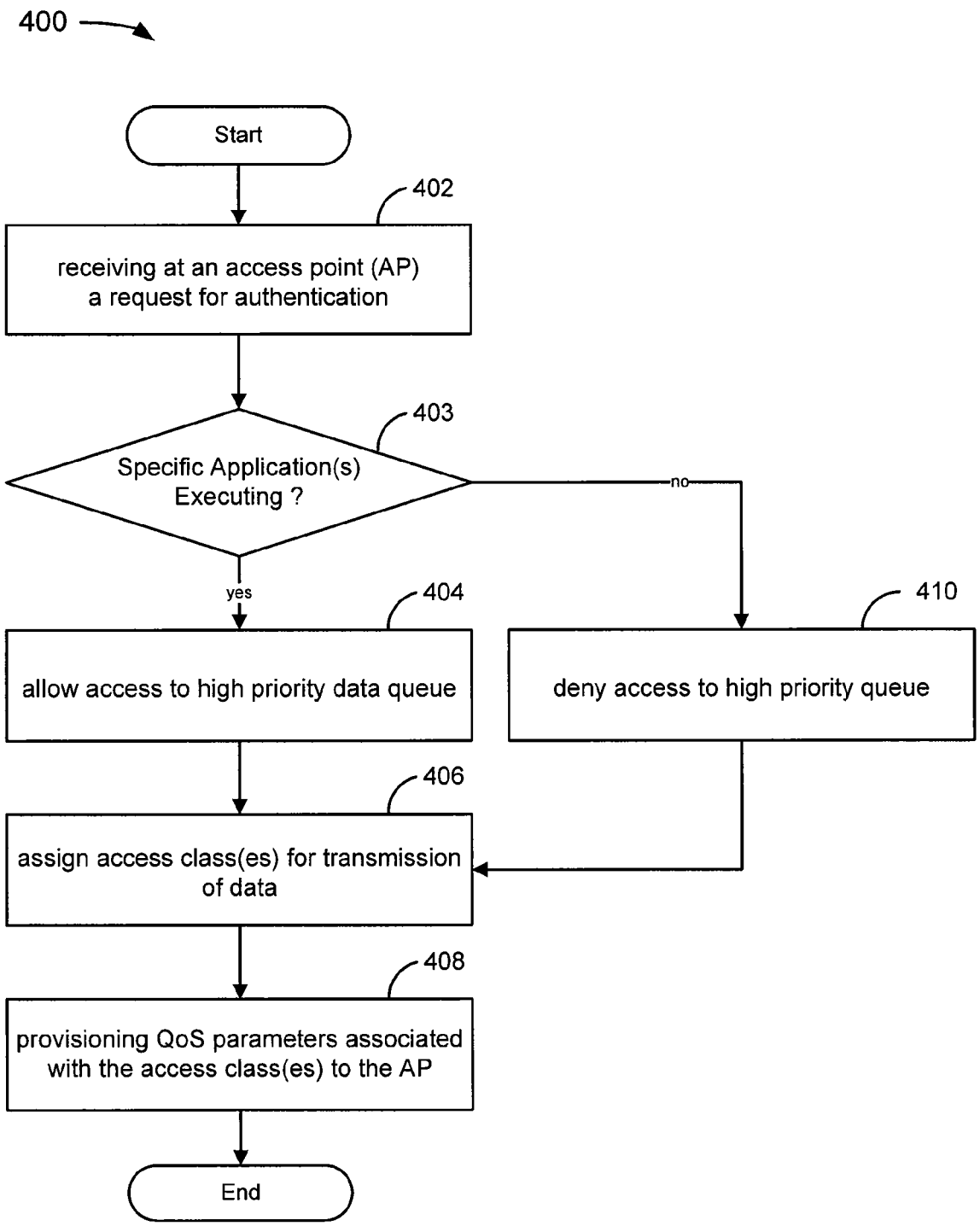
FIG. 4 depicts a flowchart 400 of an example of a method for dynamically provisioning QoS parameters including verifying that an application that requires priority is executing on a station.

FIG. 4 depicts a flowchart 400 of an example of a method for dynamically provisioning QoS parameters including verifying that a specific application is executing on a station. The method is organized as a sequence of modules in the flowchart 400. However, it should be understood that these and other modules associated with other methods described herein may be reordered for parallel execution or into different sequences of modules.

In the example of FIG. 4 flowchart 400 starts at module 402 with receiving a at an access point (AP) a request for authentication. The request may come from a station desiring to transmit data through the access point in accordance with an access class. It may be that the request asserts the right to use a particular access class to achieve high priority transmission of data. In a non-limiting example, a request may assert the right to use the voice queue because the station operates a softphone. However, users naturally want the best service possible and will be tempted to try and move their best effort traffic into the voice and video queues even when they are not transmitting voice and video. Using specifications like the Trusted Computing Group's Trusted Network Connect (TNC), a system can be "validated" before it is allowed to use the network. That validation may include verifying that an appropriate program is running before allowing access to high-priority queues. In a non-limiting example, a verification engine may allow access to the voice queue only if a softphone is running on the client computer.

In the example of FIG. 4, the flowchart 400 continues to decision module 403 with determining whether a specific application is (or specific applications are) executing. In some embodiments, a verification engine can determine whether or not a specific software application is executing on the station. In a non-limiting example, the verification engine determines whether a softphone is executing on the station and instructs a server to deny the station use of a high priority data transmission queue if the software application is not executing on the station.

In the example of FIG. 4, if the result of decision module 403 is yes, then the flowchart continues to module 406 with assigning an access class (or access classes) for transmission of data. A program running on a station may be associated with a particular level of priority. In this case, a program was presumably running on the station that is one a group of specific programs that enable access to high priority queues. Accordingly, the station is approved to use the high priority queue to transmit data.

In the example of FIG. 4, the flowchart 400 continues to module 408 with provisioning QoS parameters associated with the access class (or access classes) to the AP. In a non-limiting example, the QoS parameters are passed around the network in a station switching record. The QoS parameters having been provisioned, the flowchart 400 ends.

In the example of FIG. 4, from decision module 403, if the result of decision module 403 is no, then the flowchart continues to module 410 with assigning, in response to the request, an access class for transmission of data. In this case the station is found to be falsely asserting a request to use the high priority queue. An appropriate response is then denial of the request.

In the example of FIG. 4, the flowchart 400 continues to module 406 with assign access class for transmission of data. Although the request has been denied, it is not necessary to exclude the station from use of the network. The station could be assigned a lower priority class, in a non-limiting example the station is assigned to the best effort access class. This allows it to transmit data, but without the high priority it has requested. The flowchart 400 then continues to module 408, as described previously.

Figure 5:
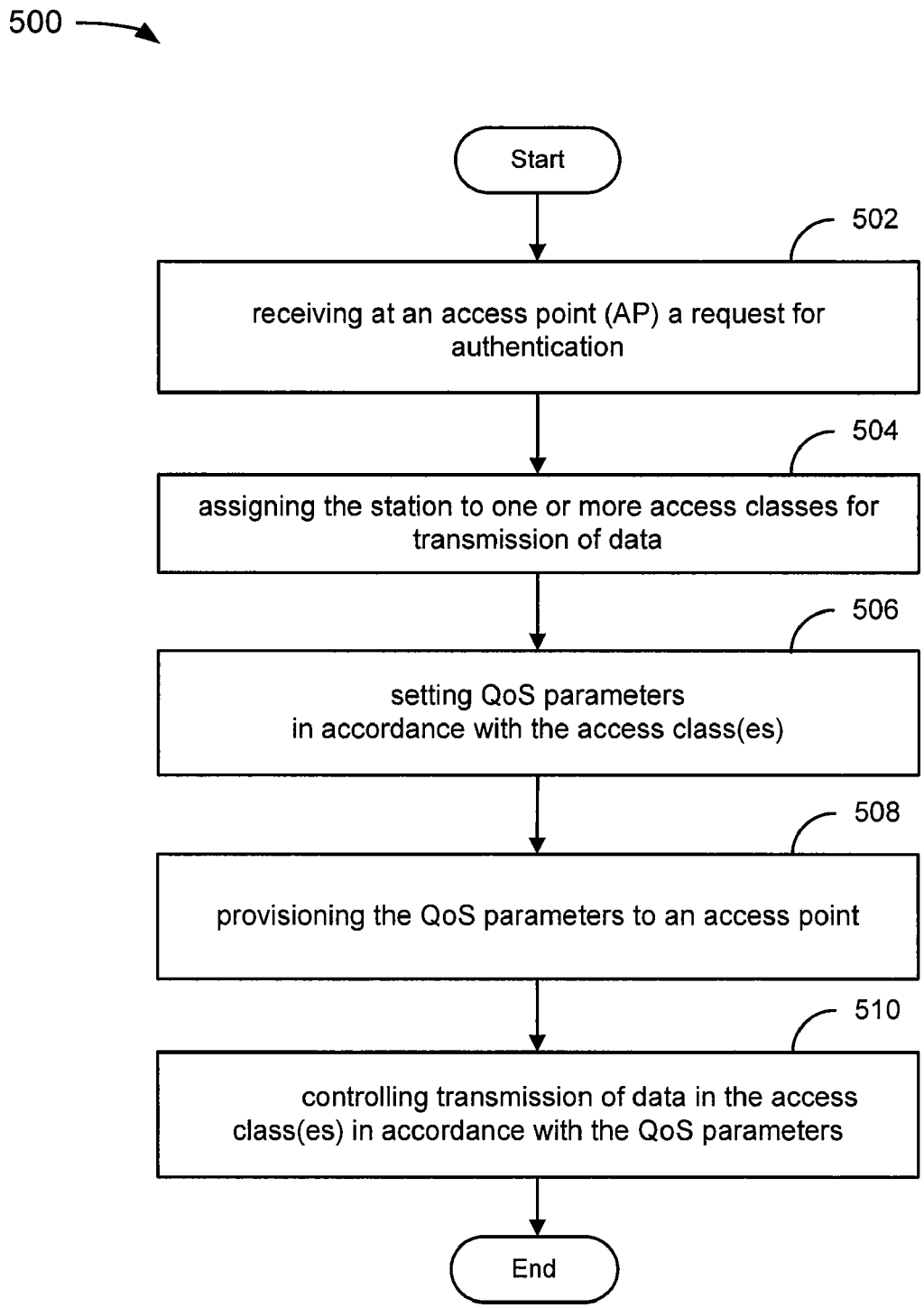
FIG. 5 depicts a flowchart 500 of an example of a method for dynamically provisioning QoS parameters.

FIG. 5 depicts a flowchart 500 of an example of a method for dynamically provisioning QoS parameters. The method is organized as a sequence of modules in the flowchart 500. However, it should be understood that these and other modules associated with other methods described herein may be reordered for parallel execution or into different sequences of modules.

In the example of FIG. 5 flowchart 500 starts at module 502 with receiving a at an access point (AP) a request for authentication. The request may come from a station desiring to transmit data through the access point in accordance with an access class.

In the example of FIG. 5, the flowchart 500 continues to module 504 with assigning the station to one or more access classes for transmission of data. In the case that the station asserts the right to use a high priority class, it may be that the station is validated using a verification engine to make certain that a required program is executing on the station before allowing the station to use the high priority queue. In some embodiments, the access classes are defined by a network administrator and the one or more access classes are assigned in accordance therewith.

In the example of FIG. 5, the flowchart 500 continues to module 506 with setting QoS parameters in accordance with the one or more access classes. QoS parameters can be stored in a Lightweight Directory Access Protocol (LDAP) directory associated with the security credentials for a telephone. In such an implementation, the network could, for example, perform an LDAP query against the telephone's account and make that part of the session record.

In the example of FIG. 5, the flowchart 500 continues to module 508 with provisioning the QoS parameters to an access point. Provisioning could be accomplished by passing the parameters around the networking in a station switching record. Alternatively, they could be directly transmitted to the station by a server.

In the example of FIG. 5, the flowchart 500 continues to module 510 with controlling transmission of data in the one or more access classes in accordance with the QoS parameters. A capacity management and prioritization system may include a network system that takes into account the capacity of a particular access device as part of authentication. For example, a station that has requested QoS resources to which it is administratively allowed but are not available at the target access point might be redirected to a device at which those resources are available. Stations that are allowed on the network for best-effort service may initially be allowed on the network, but moved to a different access point when additional QoS is requested by, for example, a softphone.

Figure 6:
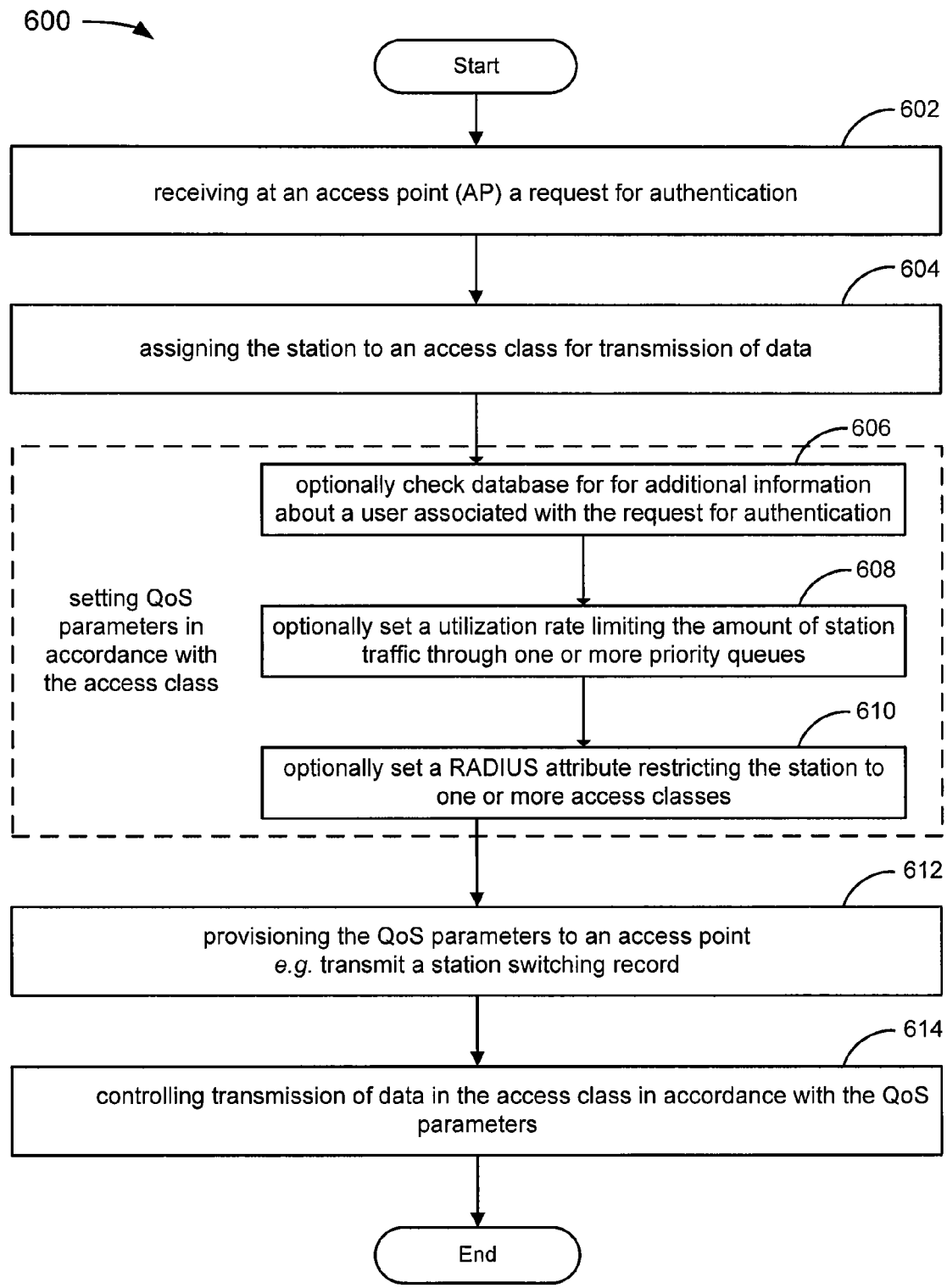
FIG. 6 depicts a flowchart 600 of an example of a method for dynamically provisioning QoS parameters including checking a database, setting a utilization rate, and/or setting a RADIUS attribute.

FIG. 6 depicts a flowchart 600 of an example of a method for dynamically provisioning QoS parameters including checking a database, setting a utilization rate, and/or setting a RADIUS attribute. The method is organized as a sequence of modules in the flowchart 400. However, it should be understood that these and other modules associated with other methods described herein may be reordered for parallel execution or into different sequences of modules.

In the example of FIG. 6 flowchart 600 starts at module 602 with receiving a at an access point (AP) a request for authentication. The request may come from a station desiring to transmit data through the access point in accordance with an access class.

In the example of FIG. 6, the flowchart 600 continues to module 604 with assigning the station to an access class for transmission of data. The station may receive the class it requested, or it may be assigned to a lower class as needed.

In the example of FIG. 6, the flowchart 600 continues to module 606 with optionally check database for additional information about a user associated with the request for authentication. The QoS configuration stored in the database could restrict access to particular access classes. It might say that a particular device is only allowed to do voice (if it is a telephone), or that it is only allowed best effort data (for a general-purpose device such as a laptop).

In some embodiments, backend databases can be used to manage access to the high-priority queues. By way of example but not limitation, a backend database may include information about the relative importance of each user in access to a voice queue. By labeling priorities, the system may ensure that, for example, the CEO's telephone is always able to gain access to the voice queue at the expense of lower-ranking users.

In the example of FIG. 6, the flowchart 600 continues to module 608 with optionally set a utilization rate limiting the amount of station traffic through one or more priority queues. Each access class can optionally have a utilization rate associated with it. When a device associates with a particular access class using Traffic SPECification (TSPEC), the request can be denied if it asks for more than a utilization rate. For example, a network administrator may impose a limit of 100 kbps of traffic to the voice queue per device; if a station requests more than the limit, the network may respond with a denial and grant the maximum allowable rate. In a non-limiting example, network administrators could use this type of feature to require clients to use lower-bandwidth codecs for Voice over Internet Protocol (VoIP).

In the example of FIG. 6, the flowchart 600 continues to module 610 with optionally set a RADIUS attribute restricting the station to one or more access classes. Dynamic Quality of Service (QoS) parameters may be configured through the use of a Remote Access Dial In User Service (RADIUS) attribute. However, QoS parameters might be further enhanced to, for instance, allow or disallow use of a particular 802.11e access class. For example, a device may be permitted to send video, but not be permitted to send voice.

In the example of FIG. 6, the flowchart 600 continues to module 612 with provisioning the QoS parameters to an access point e.g. transmit a station switching record. In some embodiments, a station switching record containing QoS parameters is passed around a network.

In the example of FIG. 6, the flowchart 600 continues to module 614 with controlling transmission of data in the access class in accordance with the QoS parameters. A capacity management and prioritization system may include a network system that takes into account the capacity of a particular access device as part of authentication. For example, a station that has requested QoS resources to which it is administratively allowed but are not available at the target access point might be redirected to a device at which those resources are available. Stations that are allowed on the network for best-effort service may initially be allowed on the network, but moved to a different access point when additional QoS is requested by, for example, a softphone.

Figure 7:
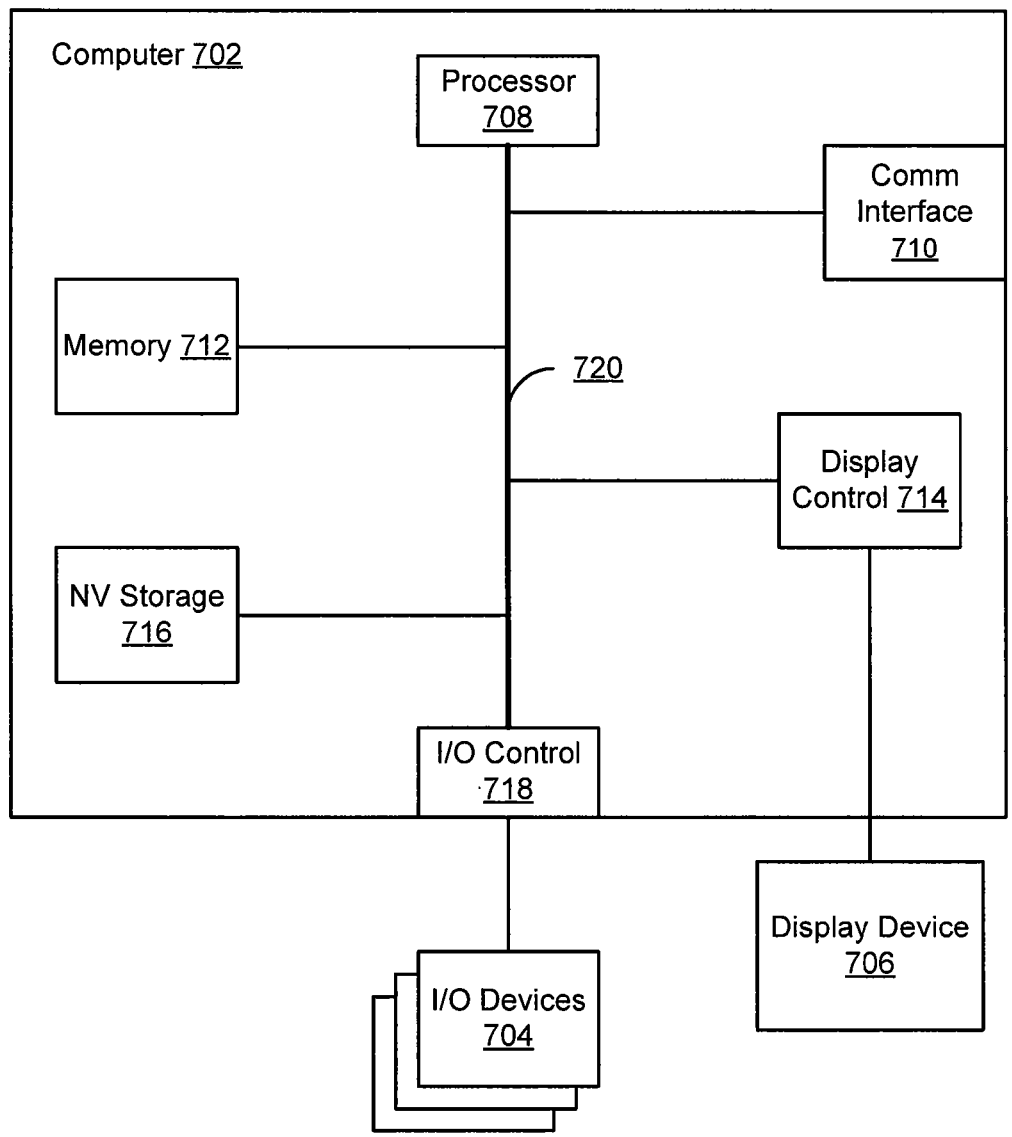
FIG. 7 depicts a diagram 700 of a computer system for use in the system of FIG. 1.

FIG. 7 depicts a computer system 700 for use in the system 100 (FIG. 1). The computer system 700 may be a conventional computer system that can be used as a client computer system, such as a wireless client or a workstation, or a server computer system. The computer system 700 includes a computer 702, I/O devices 704, and a display device 706. The computer 702 includes a processor 708, a communications interface 710, memory 712, display controller 714, non-volatile storage 716, and I/O controller 718. The computer 702 may be coupled to or include the I/O devices 704 and display device 706.

The computer 702 interfaces to external systems through the communications interface 710, which may include a modem or network interface. It will be appreciated that the communications interface 710 can be considered to be part of the computer system 700 or a part of the computer 702. The communications interface 710 can be an analog modem, ISDN modem, cable modem, token ring interface, satellite transmission interface (e.g. "direct PC"), or other interfaces for coupling a computer system to other computer systems.

The processor 708 may be, for example, a conventional microprocessor such as an Intel Pentium microprocessor or Motorola power PC microprocessor. The memory 712 is coupled to the processor 708 by a bus 770. The memory 712 can be Dynamic Random Access Memory (DRAM) and can also include Static RAM (SRAM). The bus 770 couples the processor 708 to the memory 712, also to the non-volatile storage 716, to the display controller 714, and to the I/O controller 718.

The I/O devices 704 can include a keyboard, disk drives, printers, a scanner, and other input and output devices, including a mouse or other pointing device. The display controller 714 may control in the conventional manner a display on the display device 706, which can be, for example, a cathode ray tube (CRT) or liquid crystal display (LCD). The display controller 714 and the I/O controller 718 can be implemented with conventional well known technology.

The non-volatile storage 716 is often a magnetic hard disk, an optical disk, or another form of storage for large amounts of data. Some of this data is often written, by a direct memory access process, into memory 712 during execution of software in the computer 702. One of skill in the art will immediately recognize that the terms "machine-readable medium" or "computer-readable medium" includes any type of storage device that is accessible by the processor 708 and also encompasses a carrier wave that encodes a data signal.

The computer system 700 is one example of many possible computer systems which have different architectures. For example, personal computers based on an Intel microprocessor often have multiple buses, one of which can be an I/O bus for the peripherals and one that directly connects the processor 708 and the memory 712 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 712 for execution by the processor 708. A Web TV system, which is known in the art, is also considered to be a computer system, but it may lack some of the features shown in FIG. 7, such as certain input or output devices. A typical computer system will usually include at least a processor, memory, and a bus coupling the memory to the processor.

In addition, the computer system 700 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 716 and causes the processor 708 to execute the various acts required by the operating system to input and output data and to store data in memory, including storing files on the non-volatile storage 716.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result.

The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 8:
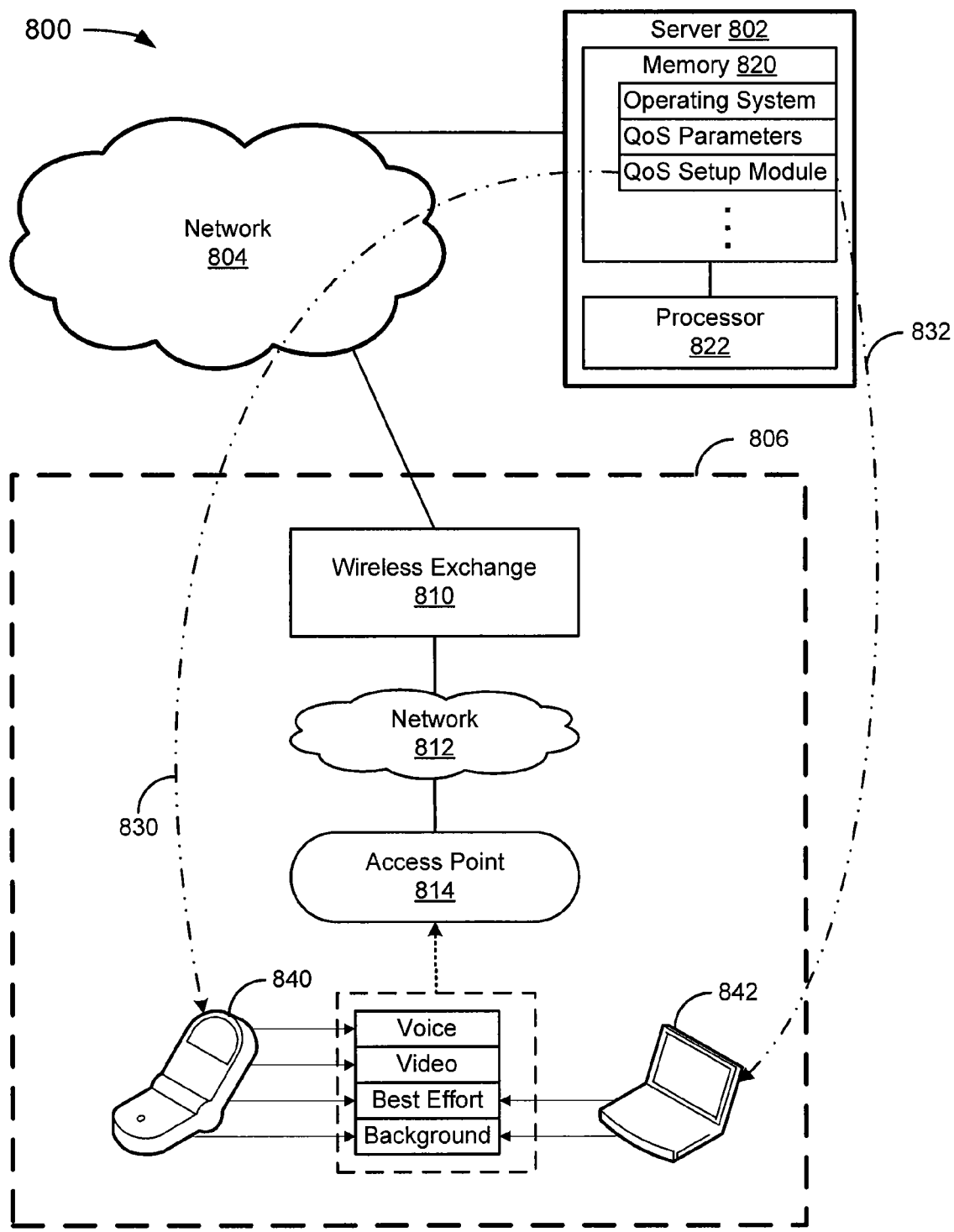
FIG. 8 depicts an example of a system 800 for dynamically provisioning QoS parameters to stations.

FIG. 8 depicts an example of a system 800 for dynamically provisioning QoS parameters to stations. The system 800 includes a server 802, a network 804, a wireless access domain 806, parameter provisioning indicator 830, parameter provisioning indicator 832, phone 840, and laptop 842. The system 800 may or may not include multiple wireless access domains. Server 802 includes memory 820 and processor 822.

In the example of system 800, phone 840 and a laptop 842 each receive dynamically provisioned QoS parameters. Phone 840 is an example of a station requiring high priority access. Phone 840 executes a soft phone application. Laptop 842 is an example of a station that may require only relatively low priority access. It is noted that a laptop could operate a soft phone, however, for this non-limiting example, laptop 842 does not execute a soft phone, and operates only software requiring continuous transmission of large blocks of data having relatively time-insensitive requirements, e.g. gigantic blocks of meteorological data on weather patterns continuously recorded for long term analysis. Further, in this case, laptop 842 has been instructed to transmit data in the highest priority available in accordance with the design of the software by its creators.

In a case where there is no dynamic QoS provisioning, laptop 842 might interfere with phone 840's quality of transmission because laptop 842 would continuously transmit data in competition with phone 840 demanding highest priority. However, QoS parameters dynamically created in accordance with the granting of high or low priority access classes are provisioned in accordance with parameter provisioning indicator 830 and parameter provisioning indicator 832. Laptop 842 is provisioned, via provisioning indicator 832, QoS parameters that deny the laptop access to either the voice or video queues. Laptop 842 is denied the high priority access because it cannot prove it needs a high priority access class.

Because laptop 842 does not compete for the use of the voice or video queues, the dynamic assignment of high priority access classes allows phone 840 to transmit voice and/or video data in priority above laptop 842. Advantageously, to phone 840, there is no other traffic in the voice or video queues, and phone 840 performs in high quality in accordance with requirements for voice and video transmission. Laptop 842 does not suffer a loss of quality as applications that it executes continue to use best efforts and background queues in accordance with requirements set to maintain their quality.

As used herein, a wireless network refers to any type of wireless network, including but not limited to a structured network or an ad hoc network. Data on a wireless network is often encrypted. However, data may also be sent in the clear, if desired. With encrypted data, a rogue device will have a very difficult time learning any information (such as passwords, etc.) from clients before countermeasures are taken to deal with the rogue. The rogue may be able to confuse the client, and perhaps obtain some encrypted data, but the risk is minimal (even less than for some wired networks).

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

I claim:

1. A system, comprising:
   a server configured to be coupled to a network and an access point transmitting data from a first station to the server and from a second station to the server;
   the server configured to dynamically determine quality of service (QoS) parameters for the first station and for the second station; and
   the server configured to (1) restrict the first station from a first access class from a plurality of access classes based on the QoS parameters, (2) assign the first station a second access class from the plurality of access classes based on the QoS parameters, and (3) assign the second station the first access class and the second access class based on the QoS parameters, the first access class being uniquely associated with a first priority queue from a plurality of priority queues at the access point, the second access class being different from the first access class and being uniquely associated with a second priority queue, from the plurality of priority queues, different from the first priority queue.

2. The system of claim 1, further comprising:
the server configured to be coupled to a verification engine determining whether a software application is executing on the first station; and
the server configured to receive an instruction from the verification engine to deny the first station use of first priority queue from the plurality of priority queues if the software application is not executing on the station.

3. The system of claim 1, wherein the QoS parameters include a RADIUS attribute defining permission for the first station to use the second access class.

4. The system of claim 1, wherein the first access class is an 802.11 access class.

5. The system of claim 1, wherein the first access class is associated with a utilization rate defining a limit on station traffic through first priority queue.

6. The system of claim 1, wherein:
the server configured to receive a request from the first station for the second access class from the plurality of access classes to transmit data at a rate; and
the server configured to deny the request when the rate exceeds a utilization rate.

7. The system of claim 1, wherein the server is configured to be coupled to a database storing the QoS parameters.

8. The system of claim 1, wherein the server is configured to transfer the QoS parameters to the access point in a station switching record.

9. A method, comprising:
receiving a request for authentication from a station, the request for authentication including a request for access to a first queue of an access point, the first queue of the access point associated with a first access class having a first level of priority;
when the station is executing an application authorized to be assigned the first level of priority, (1) granting the station access to the first queue of the access point and access to a second queue of the access point, the second queue associated with the second access class having a level of priority lower than the first level of priority, and (2) setting a first QoS parameter for the station; and
when the station is not executing an application authorized to be assigned the first level of priority, (1) granting the station access to the second queue of the access point without granting access to the first queue, and (2) setting a second QoS parameter for the station.

10. The method of claim 9, further comprising storing the first QoS parameter or the second QoS parameter in a lightweight data access protocol (LDAP) directory associated with security credentials for the station.

11. The method of claim 10, wherein the QoS parameters are further associated with information about a user associated with the request for authentication.

12. A method, comprising:
receiving a request from a mobile device for a first access class assignment from a server, the first access class assignment being associated with transmission of data from the mobile device to the server;
verifying that the mobile device is executing an application authorized to be assigned the first access class; and
when the mobile device is verified to be executing an application authorized to be assigned the first access class: (1) sending the first access class assignment to the server; (2) receiving a session quality of service (QoS) parameter associated with the first access class from the server for the mobile device; and (3) sending the session QoS parameter associated with the first access class to the mobile device; and
when the mobile device is not verified to be executing the application authorized to be assigned the first access class: (1) sending a second access class assignment to the server; (2) receiving a session quality of service (QoS) parameter associated with the second access class from the server for the mobile device; and (3) sending the session QoS parameter associated with the second access class to the mobile device.

13. The method of claim 12, wherein receiving the session QoS parameter associated with the first access class includes receiving a first station switching record, receiving the session QoS associated with the second access class includes receiving a second station switching record.

14. The method of claim 12, wherein the first access class is an 802.11e access class.

15. The method of claim 12, wherein the first access class is associated with a utilization rate defining a limit on station traffic through the first priority queue of an access point.

16. The method of claim 12, wherein the session QoS parameter comprise a RADIUS attribute restricting the first station to the first access class.

17. The method of claim 12, wherein the session QoS parameter is based on a QoS parameter associated with the first station and the first access class assignment.

* * * * *